US012568036B2

(12) United States Patent
Shi

(10) Patent No.: US 12,568,036 B2
(45) Date of Patent: Mar. 3, 2026

(54) ROUTE IMPORTING METHOD, DEVICE, AND SYSTEM

(71) Applicant: Huawei Technologies Co., Ltd., Shenzhen (CN)

(72) Inventor: Yangyang Shi, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 18/164,264

(22) Filed: Feb. 3, 2023

(65) Prior Publication Data

US 2023/0188454 A1 Jun. 15, 2023

Related U.S. Application Data

(63) Continuation of application No. PCT/CN2021/106084, filed on Jul. 13, 2021.

(30) Foreign Application Priority Data

Aug. 6, 2020 (CN) .......................... 202010785452.0

(51) Int. Cl.
| | |
|---|---|
| *H04L 45/02* | (2022.01) |
| *H04L 12/46* | (2006.01) |
| *H04L 45/18* | (2022.01) |
| *H04L 41/0895* | (2022.01) |

(52) U.S. Cl.
CPC .......... *H04L 45/02* (2013.01); *H04L 12/4641* (2013.01); *H04L 45/04* (2013.01); *H04L 45/18* (2013.01); *H04L 41/0895* (2022.05)

(58) Field of Classification Search
None
See application file for complete search history.

(56) References Cited

U.S. PATENT DOCUMENTS

| | | | |
|---|---|---|---|
| 2005/0108379 A1* | 5/2005 | Gray | H04L 43/55 709/223 |
| 2005/0188106 A1 | 8/2005 | Pirbhai et al. | |
| 2014/0313928 A1 | 10/2014 | Fernando et al. | |
| 2019/0028381 A1* | 1/2019 | Li | H04L 69/03 |

FOREIGN PATENT DOCUMENTS

CN 106059882 A 10/2016

* cited by examiner

*Primary Examiner* — Christine T Duong
(74) *Attorney, Agent, or Firm* — Conley Rose, P.C.

(57) ABSTRACT

A route importing method includes after importing first routing information of a first VPN instance in a second network device from a first VPN instance to a second VPN instance in a first network device, the first network device imports the first routing information from the second VPN instance to a third VPN instance in the first network device, rather than separately importing the routing information of the first VPN instance from the first VPN instance to the second VPN instance and the third VPN instance.

20 Claims, 11 Drawing Sheets

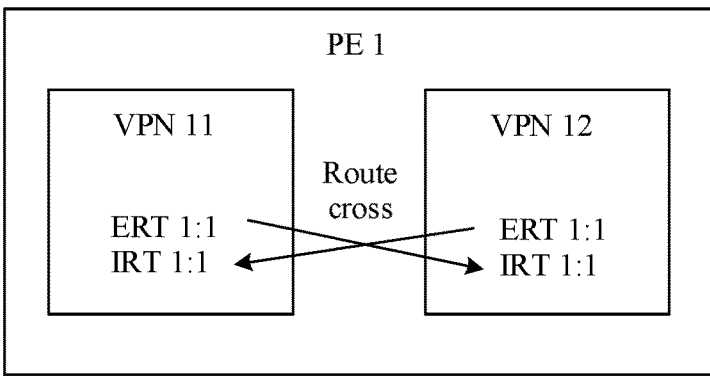

FIG. 4

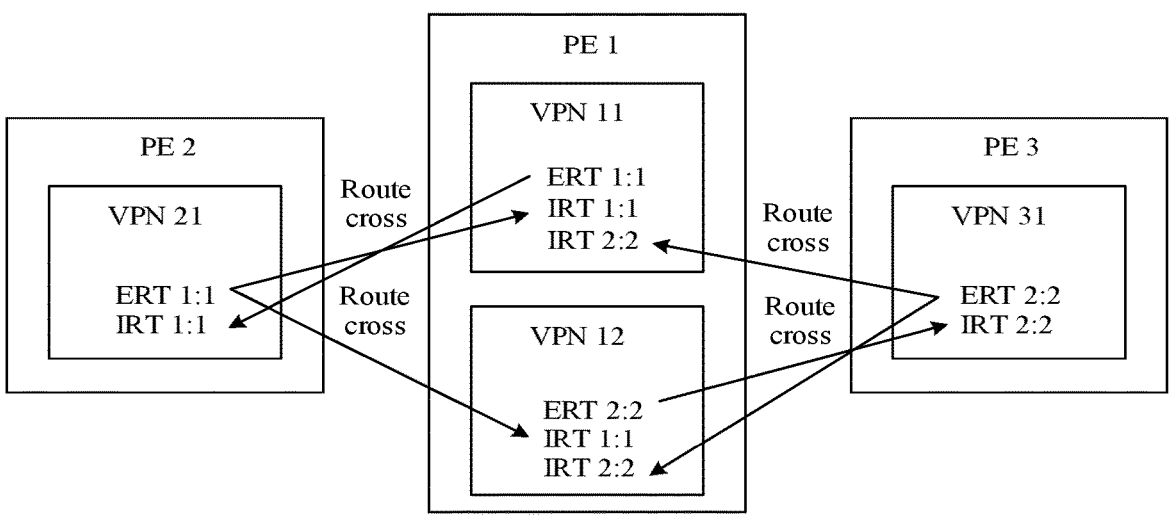

FIG. 5

| | |
|---|---|
| A first network device imports routing information of a first VPN instance in a second network device from the first VPN instance to a second VPN instance in the first network device, where the routing information of the first VPN instance corresponds to a first ERT in the first VPN instance, and the first ERT matches an IRT in the second VPN instance | 601 |
| The first network device imports the routing information of the first VPN instance from the second VPN instance in the first network device to a third VPN instance in the first network device | 602 |

FIG. 6

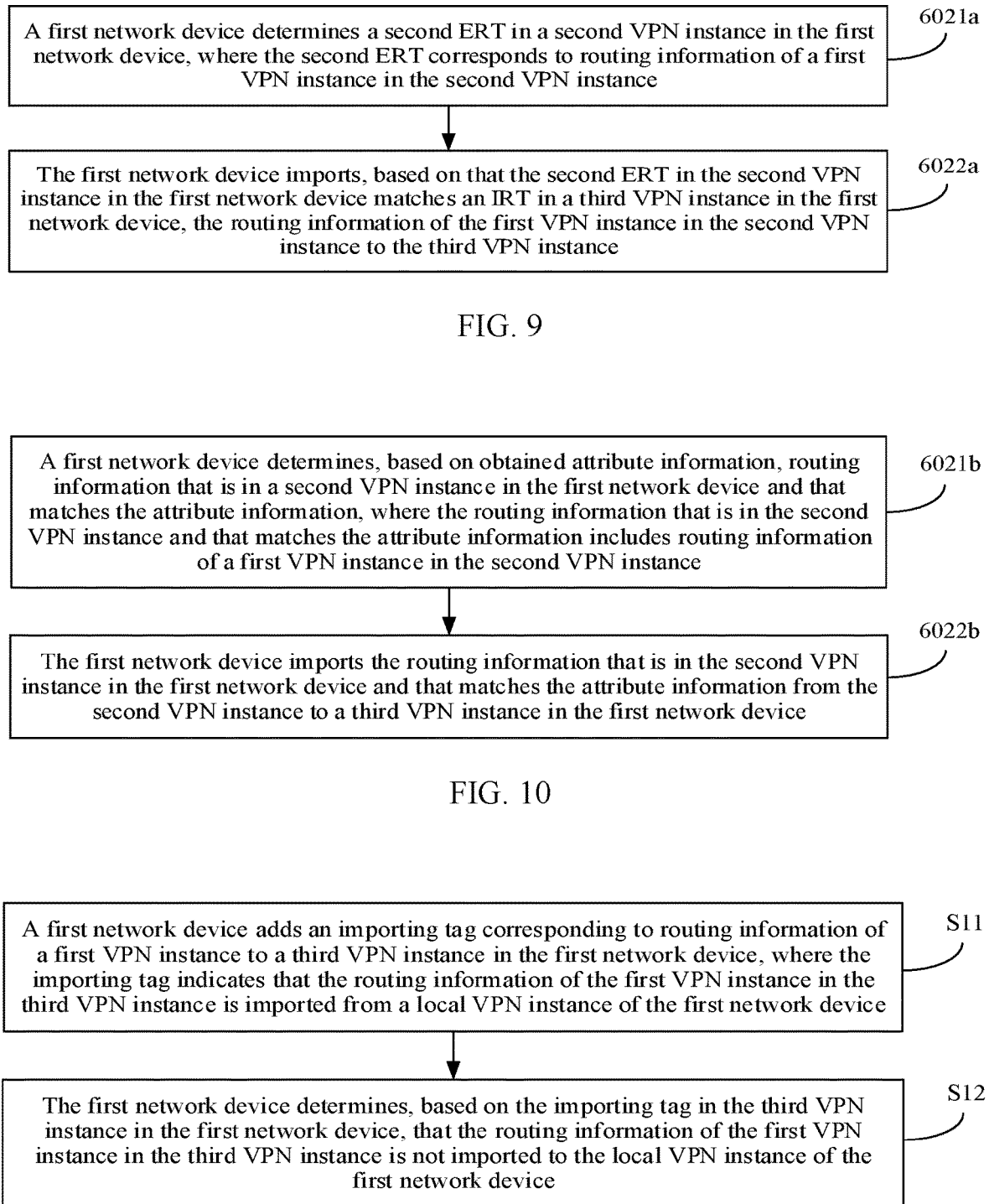

A first network device determines a second ERT in a second VPN instance in the first network device, where the second ERT corresponds to routing information of a first VPN instance in the second VPN instance 6021a The first network device imports, based on that the second ERT in the second VPN instance in the first network device matches an IRT in a third VPN instance in the first network device, the routing information of the first VPN instance in the second VPN instance to the third VPN instance 6022a

FIG. 9

A first network device determines, based on obtained attribute information, routing information that is in a second VPN instance in the first network device and that matches the attribute information, where the routing information that is in the second VPN instance and that matches the attribute information includes routing information of a first VPN instance in the second VPN instance 6021b The first network device imports the routing information that is in the second VPN instance in the first network device and that matches the attribute information from the second VPN instance to a third VPN instance in the first network device 6022b

FIG. 10

A first network device adds an importing tag corresponding to routing information of a first VPN instance to a third VPN instance in the first network device, where the importing tag indicates that the routing information of the first VPN instance in the third VPN instance is imported from a local VPN instance of the first network device

S11

The first network device determines, based on the importing tag in the third VPN instance in the first network device, that the routing information of the first VPN instance in the third VPN instance is not imported to the local VPN instance of the first network device

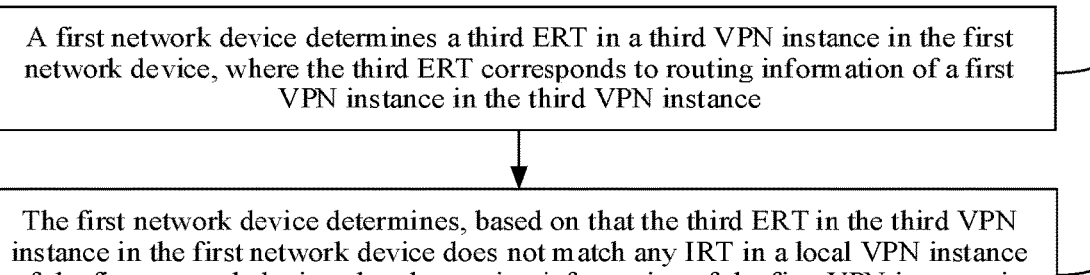

A first network device determines a third ERT in a third VPN instance in the first network device, where the third ERT corresponds to routing information of a first VPN instance in the third VPN instance    S21

The first network device determines, based on that the third ERT in the third VPN instance in the first network device does not match any IRT in a local VPN instance of the first network device, that the routing information of the first VPN instance in the third VPN instance is not imported to the local VPN instance of the first network device    S22

FIG. 12

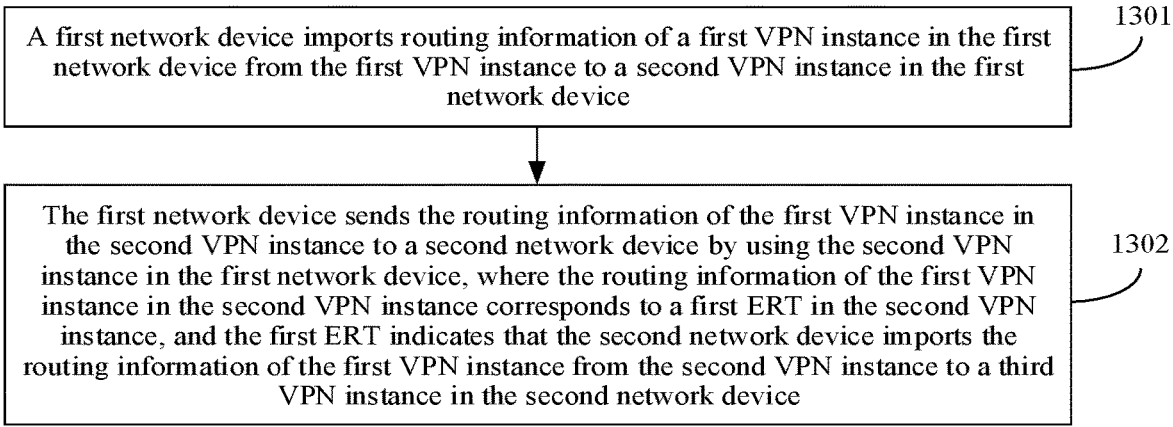

A first network device imports routing information of a first VPN instance in the first network device from the first VPN instance to a second VPN instance in the first network device    1301

The first network device sends the routing information of the first VPN instance in the second VPN instance to a second network device by using the second VPN instance in the first network device, where the routing information of the first VPN instance in the second VPN instance corresponds to a first ERT in the second VPN instance, and the first ERT indicates that the second network device imports the routing information of the first VPN instance from the second VPN instance to a third VPN instance in the second network device    1302

FIG. 13

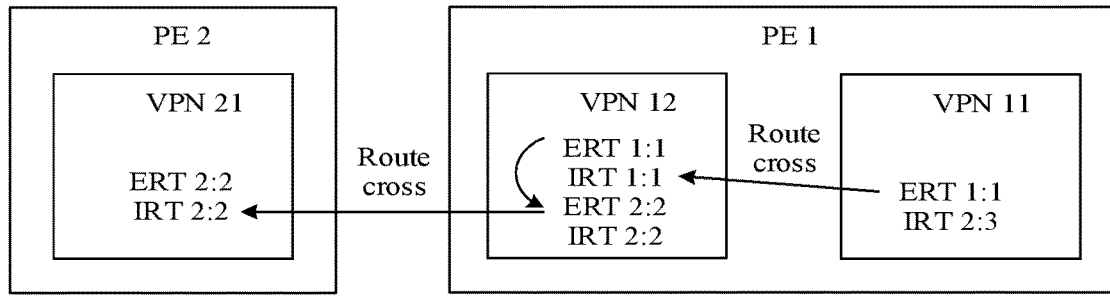

ROUTE IMPORTING METHOD, DEVICE, AND SYSTEM

CROSS-REFERENCE TO RELATED APPLICATIONS

This application is a continuation of International Patent Application No. PCT/CN2021/106084, filed on Jul. 13, 2021, which claims priority to Chinese Patent Application No. 202010785452.0, filed on Aug. 6, 2020. The disclosures of the aforementioned applications are hereby incorporated by reference in their entireties.

TECHNICAL FIELD

The present disclosure relates to the field of network technologies, and in particular, to a route importing method, a device, and a system.

BACKGROUND

At least one virtual private network (VPN) instance is configured in a provider edge (PE) device in an Ethernet virtual private network (EVPN) network, each VPN instance corresponds to at least one virtual machine (VM) connected to the PE device, and each VPN instance is used to forward a packet of the VM, so as to implement communication between different VMs.

When VMs in two different VPN instances need to communicate with each other, a route of one VPN instance may be imported to the other VPN instance in a manner of route cross, so that route interworking between the two VPN instances is implemented. An import route target (IRT) and an export route target (ERT) are configured in a VPN instance. Route cross means that a route of one VPN instance is imported to another VPN instance by matching the IRT with the ERT. Route cross is classified into local cross and remote cross based on different route sources. In an example of local cross, a PE device matches an ERT in a local VPN instance with IRTs in other local VPN instances. If the ERT in the local VPN instance may match an IRT in a specific VPN instance in the other VPN instances, a Border Gateway Protocol (BGP) route of the VPN instance in which the ERT is located is written into a routing table of the matched VPN instance, so that the BGP route is imported to the matched VPN instance. In an example of remote cross, after learning a BGP EVPN route (which is a BGP EVPN protocol-based route, and a BGP EVPN protocol is an extension protocol of BGP) of a VPN instance of a remote PE device from the remote PE device, a PE device matches an ERT carried in the BGP EVPN route with IRTs in VPN instances of the PE device. If the ERT carried in the BGP EVPN route may match an IRT in a specific local VPN instance of the PE device, the BGP EVPN route is converted into a BGP route, and the BGP route is written into a routing table of a matched VPN instance, so that the BGP EVPN route is imported to the matched VPN instance.

However, in a local cross scenario, in an existing mechanism, route interworking between a local VPN instance and a remote VPN instance (which is a VPN instance in a remote PE) cannot be implemented, which affects normal communication between VMs mounted to different PE devices. Consequently, application scenarios of route importing are limited. In a remote cross scenario, to implement mutual access of a large quantity of VPN instances between a plurality of PE devices, a large quantity of paired ERTs and IRTs need to be configured on the plurality of PE devices. As a result, service logic and configurations are complex, effective isolation between VPN instances is easily damaged, service security cannot be ensured, and possibilities that a loop occurs and that a fault spreads are increased.

SUMMARY

The present disclosure provides a route importing method, a device, and a system, to help simplify service logic and configuration, ensure service security, and avoid a loop and spreading of a fault. In addition, application scenarios of route importing are wide. The technical solutions of the present disclosure are as follows.

According to a first aspect, a route importing method is provided. The method includes: a first network device imports routing information of a first VPN instance in a second network device from the first VPN instance to a second VPN instance in the first network device, where the routing information of the first VPN instance corresponds to a first ERT in the first VPN instance, and the first ERT matches an IRT in the second VPN instance. The first network device imports the routing information of the first VPN instance from the second VPN instance to a third VPN instance in the first network device. The routing information of the first VPN instance may be information in one or more routes belonging to the first VPN instance, to be specific, when one or more routes in the first VPN instance of the second network device are imported to the second VPN instance of the first network device, the routing information of the first VPN instance is also imported to the second VPN instance, where the routing information is related information in the one or more routes.

According to the technical solution provided in the present disclosure, routing information in a VPN instance of a second network device is first imported to a first network device, and then the first network device implements interworking on the routing information between different VPN instances of the first network device in a manner of local cross. Mutual access of a large quantity of VPN instances between the first network device and the second network device can be implemented without configuring a large quantity of paired ERTs and IRTs in the first network device and the second network device. This helps simplify service logic and configuration, and can ensure service security by ensuring that different VPN instances are effectively isolated from each other, avoid a loop and spreading of a fault, and implement normal communication between VMs of different network devices. In addition, application scenarios of route importing are wide.

Optionally, that the first network device imports the routing information of the first VPN instance from the second VPN instance to a third VPN instance includes: the first network device determines a second ERT in the second VPN instance, where the second ERT corresponds to the routing information of the first VPN instance in the second VPN instance. The first network device imports, based on that the second ERT matches an IRT in the third VPN instance, the routing information of the first VPN instance in the second VPN instance to the third VPN instance. The routing information of the first VPN instance in the second VPN instance is routing information of the first VPN instance recorded (or stored) in the second VPN instance, and the routing information of the first VPN instance in the second VPN instance is obtained by performing import processing on the routing information of the first VPN instance in the first VPN instance.

According to the technical solution provided in the present disclosure, the first network device imports the routing information of the first VPN instance from the second VPN instance to the third VPN instance in a manner of matching an ERT with an IRT, to help improve accuracy of route importing. Importing a route in a manner of matching an ERT with an IRT is importing a route in a manner of route cross. Because both the second VPN instance and the third VPN instance are located in the first network device, the routing information of the first VPN instance is imported from the second VPN instance to the third VPN instance in the manner of route cross, that is, the routing information of the first VPN instance is imported from the second VPN instance to the third VPN instance in a manner of local cross manner.

Optionally, that the first network device imports the routing information of the first VPN instance from the second VPN instance to a third VPN instance includes: the first network device determines, based on obtained attribute information, routing information that is in the second VPN instance and that matches the attribute information, where the routing information that is in the second VPN instance and that matches the attribute information includes routing information of the first VPN instance in the second VPN instance. The first network device imports the routing information that is in the second VPN instance and that matches the attribute information from the second VPN instance to the third VPN instance. The routing information that is in the second VPN instance and that matches the attribute information includes routing information of the first VPN instance in the second VPN instance. Therefore, the routing information that is in the second VPN instance and that matches the attribute information is imported to the third VPN instance from the second VPN instance, so that the routing information of the first VPN instance in the second VPN instance can be imported to the third VPN instance from the second VPN instance.

According to the technical solution provided in the present disclosure, the first network device imports the routing information of the first VPN instance from the second VPN instance to the third VPN instance in a manner of attribute matching. Therefore, the routing information of the first VPN instance can be imported from the second VPN instance to the third VPN instance without configuring paired ERTs and IRTs between the second VPN instance and the third VPN instance, so as to implement route interworking between the first VPN instance and the third VPN instance. This helps simplify service configuration.

Optionally, the attribute information includes a route type and an identifier of the second VPN instance. That the first network device determines, based on obtained attribute information, routing information that is in the second VPN instance and that matches the attribute information includes: the first network device determines, based on the route type and the identifier of the second VPN instance, the routing information that is in the second VPN instance and that matches the attribute information, where the routing information that is in the second VPN instance and that matches the attribute information includes one or more routes that are in the second VPN instance and that have the route type, and the one or more routes include the routing information of the first VPN instance. The route type may be, for example, a BGP route or a static route.

According to the technical solution provided in the present disclosure, the first network device determines, based on the route type and the identifier of the second VPN instance, the routing information that is in the second VPN instance and that matches the attribute information. Therefore, the first network device can import, from the second VPN instance, the routing information that is in the second VPN instance and that matches the attribute information to the third VPN instance.

Optionally, before the first network device imports the routing information of the first VPN instance from the second VPN instance to the third VPN instance, the method further includes: the first network device allows, according to obtained instructions, the routing information of the first VPN instance to be imported from the second VPN instance to the third VPN instance.

According to the technical solution provided in the present disclosure, the first network device allows, according to the obtained instructions, the routing information of the first VPN instance to be imported from the second VPN instance to the third VPN instance. This helps improve accuracy of route importing, and ensure service security by ensuring that VPN instances that do not need to perform mutual route importing can be isolated.

Optionally, after the first network device imports the routing information of the first VPN instance from the second VPN instance to the third VPN instance, the method further includes: the first network device adds an importing tag corresponding to the routing information of the first VPN instance to the third VPN instance, where the importing tag indicates that the routing information of the first VPN instance in the third VPN instance is imported from a local VPN instance of the first network device. A routing table of the third VPN instance may include an importing field, and the first network device may add the importing flag to the importing field.

According to the technical solution provided in the present disclosure, the first network device adds the importing tag corresponding to the routing information of the first VPN instance to the third VPN instance, so that the first network device can distinguish between routing information that is in the third VPN instance and that is imported from the local VPN instance and other routing information in the third VPN instance.

Optionally, after the first network device adds an importing tag corresponding to the routing information of the first VPN instance to the third VPN instance, the method further includes: the first network device determines, based on the importing tag in the third VPN instance, not to import the routing information of the first VPN instance in the third VPN instance to the local VPN instance of the first network device. The routing information of the first VPN instance in the third VPN instance refers to routing information of the first VPN instance recorded (or stored) in the third VPN instance.

In the technical solutions provided in the present disclosure, the importing tag indicates that the routing information of the first VPN instance in the third VPN instance is imported from the local VPN instance of the first network device. Therefore, the first network device determines, based on the importing tag in the third VPN instance, not to import the routing information of the first VPN instance in the third VPN instance to the local VPN instance of the first network device. That the routing information imported from the second VPN instance to the third VPN instance is imported back to the second VPN instance again can be avoided, so as to avoid a routing loop and avoid too much same routing information being stored in one VPN instance.

Optionally, after the first network device imports the routing information of the first VPN instance from the second VPN instance to the third VPN instance, the method further includes: the first network device determines a third ERT in the third VPN instance, where the third ERT corresponds to the routing information of the first VPN instance in the third VPN instance. The first network device determines, based on that the third ERT does not match any IRT in a local VPN instance of the first network device, not to import the routing information of the first VPN instance in the third VPN instance to the local VPN instance of the first network device. The routing information of the first VPN instance in the third VPN instance refers to routing information of the first VPN instance recorded (or stored) in the third VPN instance.

In the technical solutions provided in the present disclosure, the third ERT corresponds to the routing information of the first VPN instance in the third VPN instance, and the third ERT does not match any IRT in the local VPN instance of the first network device. Therefore, the first network device determines not to import the routing information of the first VPN instance in the third VPN instance to the local VPN instance of the first network device. By setting the third ERT that does not match any IRT in the local VPN instance of the first network device, that the routing information imported from the second VPN instance to the third VPN instance is imported back to the second VPN instance again can be avoided, so as to avoid a routing loop and avoid too much same routing information being stored in one VPN instance.

Optionally, after the first network device imports the routing information of the first VPN instance from the second VPN instance to the third VPN instance, the method further includes: the first network device sends the routing information of the first VPN instance in the third VPN instance to a third network device by using the third VPN instance, where the routing information of the first VPN instance in the third VPN instance corresponds to the third ERT in the third VPN instance, and the third ERT indicates that the third network device imports the routing information of the first VPN instance from the third VPN instance to a fourth VPN instance in the third network device.

According to the technical solution provided in the present disclosure, the first network device sends the routing information of the first VPN instance in the third VPN instance to the third network device by using the third VPN instance, so that the third network device can import the routing information of the first VPN instance from the third VPN instance to the fourth VPN instance in the third network device, to implement route interworking between the first VPN instance and the fourth VPN instance.

Optionally, that the first network device sends the routing information of the first VPN instance in the third VPN instance to a third network device by using the third VPN instance includes: the first network device sends, based on an external advertisement function of the first network device, the routing information of the first VPN instance in the third VPN instance to the third network device by using the third VPN instance. The external advertisement function may be configured by an operation and maintenance engineer in the first network device, or may be configured by a management device of the first network device in the first network device. That the first network device has the external advertisement function means that all VPN instances in the first network device have the external advertisement function. Alternatively, it may be configured that a part of VPN instances in the first network device have the external advertisement function, and another part of VPN instances do not have the external advertisement function. For example, at least the third VPN instance in the first network device is configured to have the external advertisement function.

According to the technical solution provided in the present disclosure, the first network device sends, based on the external advertisement function of the first network device, the routing information of the first VPN instance in the third VPN instance to the third network device, so as to ensure security of the routing information of the first VPN instance, and facilitate the first network device to control routing information exporting.

Alternatively, both the first network device and the second network device are PE devices.

According to a second aspect, a route importing method is provided. The method includes: a first network device imports routing information of a first VPN instance in the first network device from the first VPN instance to a second VPN instance in the first network device. The first network device sends the routing information of the first VPN instance in the second VPN instance to a second network device by using the second VPN instance, where the routing information of the first VPN instance in the second VPN instance corresponds to a first ERT in the second VPN instance, and the first ERT indicates that the second network device imports the routing information of the first VPN instance from the second VPN instance to a third VPN instance in the second network device. The routing information of the first VPN instance is information in a route in the first VPN instance, and the routing information of the first VPN instance includes one or more pieces of information belonging to the first VPN instance in the route of the first VPN instance.

According to the technical solution provided in the present disclosure, the routing information obtained after the first network device performs local cross is allowed to be imported to the second network device, so that mutual access between a large quantity of VPN instances of the first network device and the second network device can be implemented. This helps simplify service logic and configuration, and can implement normal communication between VMs of different network devices. Application scenarios of route importing are wide.

Optionally, that a first network device imports routing information of a first VPN instance from the first VPN instance to a second VPN instance includes: the first network device imports, based on that a second ERT in the first VPN instance matches an IRT in the second VPN instance, the routing information of the first VPN instance from the first VPN instance to the second VPN instance, where the second ERT corresponds the routing information of the first VPN instance in the first VPN instance. Alternatively, the first network device determines, based on obtained attribute information, routing information that is in the first VPN instance and that matches the attribute information, and imports the routing information that is in the first VPN instance and that matches the attribute information from the first VPN instance to the second VPN instance, where the routing information that is in the first VPN instance and that matches the attribute information includes routing information of the first VPN instance in the first VPN instance. The route type may be, for example, a BGP route or a static route.

According to the technical solution provided in the present disclosure, the first network device imports the routing information of the first VPN instance from the second VPN instance to the third VPN instance in a manner of matching an ERT with an IRT, to help improve accuracy of route importing. The first network device imports the routing information of the first VPN instance from the second VPN instance to the third VPN instance in a manner of attribute matching. The routing information of the first VPN instance can be imported from the second VPN instance to the third VPN instance without configuring paired ERTs and IRTs between the second VPN instance and the third VPN instance. This helps simplify service configuration.

Optionally, the routing information of the first VPN instance is generated by the first VPN instance in the first network device; the routing information of the first VPN instance is learned by the first VPN instance in the first network device from a BGP peer of the first network device; or the routing information of the first VPN instance is imported by the first VPN instance in the first network device from a fourth VPN instance in a BGP EVPN peer of the first network device. This can improve diversity of route importing.

Optionally, before a first network device imports routing information of a first VPN instance from the first VPN instance to a second VPN instance, the method further includes: the first network device allows, according to obtained instructions, the routing information of the first VPN instance to be imported from the first VPN instance to the second VPN instance.

According to the technical solution provided in the present disclosure, the first network device allows, according to the obtained instructions, the routing information of the first VPN instance to be imported from the first VPN instance to the second VPN instance. This helps improve accuracy of route importing, and ensure service security by ensuring that VPN instances that do not need to perform mutual route importing can be isolated.

Optionally, after the first network device imports routing information of the first VPN instance from the first VPN instance to the second VPN instance, the method further includes: the first network device adds an importing tag corresponding to the routing information of the first VPN instance to the second VPN instance, where the importing tag indicates that the routing information of the first VPN instance in the second VPN instance is imported from a local VPN instance of the first network device. A routing table of the second VPN instance may include an importing field, and the first network device may add the importing flag to the importing field.

According to the technical solution provided in the present disclosure, the first network device adds the importing tag corresponding to the routing information of the first VPN instance to the second VPN instance, so that the first network device can distinguish between routing information that is in the second VPN instance and that is imported from the local VPN instance and other routing information in the second VPN instance.

Optionally, after the first network device adds the importing tag corresponding to the routing information of the first VPN instance to the second VPN instance, the method further includes: the first network device determines, based on the importing tag in the second VPN instance, not to import the routing information of the first VPN instance in the second VPN instance to the local VPN instance of the first network device. The routing information of the first VPN instance in the second VPN instance refers to routing information of the first VPN instance recorded (or stored) in the second VPN instance.

In the technical solutions provided in the present disclosure, the importing tag indicates that the routing information of the first VPN instance in the second VPN instance is imported from the local VPN instance of the first network device. Therefore, the first network device determines, based on the importing tag in the second VPN instance, not to import the routing information of the first VPN instance in the second VPN instance to the local VPN instance of the first network device. That the routing information imported from the first VPN instance to the second VPN instance is imported back to the first VPN instance again can be avoided, so as to avoid a routing loop and avoid too much same routing information being stored in one VPN instance.

Optionally, after the first network device imports the routing information of the first VPN instance from the first VPN instance to the second VPN instance, the method further includes: the first network device determines the first ERT in the second VPN instance. The first network device determines, based on that the first ERT does not match any IRT in a local VPN instance of the first network device, not to import the routing information of the first VPN instance in the second VPN instance to the local VPN instance of the first network device. The routing information of the first VPN instance in the second VPN instance refers to routing information of the first VPN instance recorded (or stored) in the second VPN instance.

In the technical solutions provided in the present disclosure, the first ERT corresponds to the routing information of the first VPN instance in the second VPN instance, and the first ERT does not match any IRT in the local VPN instance of the first network device. Therefore, the first network device determines not to import the routing information of the first VPN instance in the second VPN instance to the local VPN instance of the first network device. That the routing information imported from the first VPN instance to the second VPN instance is imported back to the first VPN instance again can be avoided, so as to avoid a routing loop and avoid too much same routing information being stored in one VPN instance.

Optionally, that the first network device sends the routing information of the first VPN instance in the second VPN instance to a second network device by using the second VPN instance includes: the first network device sends, based on an external advertisement function of the first network device, the routing information of the first VPN instance in the second VPN instance to the second network device by using the second VPN instance. The external advertisement function may be configured by an operation and maintenance engineer in the first network device, or may be configured by a management device of the first network device in the first network device. That the first network device has the external advertisement function means that all VPN instances in the first network device have the external advertisement function. Alternatively, it may be configured that a part of VPN instances in the first network device have the external advertisement function, and another part of VPN instances do not have the external advertisement function. For example, at least the second VPN instance in the first network device is configured to have the external advertisement function.

According to the technical solution provided in the present disclosure, the first network device sends, based on the external advertisement function of the first network device, the routing information of the first VPN instance in the second VPN instance to the second network device, so as to ensure security of the routing information of the first VPN instance, and facilitate the first network device to control routing information exporting.

Alternatively, both the first network device and the second network device are PE devices.

It should be noted that concepts such as the first, the second, the third, and the fourth in the first aspect are independent of concepts such as the first, the second, the third, and the fourth in the second aspect. The first network device in the first aspect and the first network device in the second aspect may not be a same network device, the first VPN instance in the first aspect and the first VPN instance in the second aspect may not be a same VPN instance, and the first ERT in the first aspect and the first ERT in the second aspect may not be a same ERT. The concepts of the second, the third, and the fourth are similar.

According to a third aspect, a first network device is provided, and the first network device includes: a first importing module configured to import, by the first network device, routing information of a first VPN instance in a second network device from the first VPN instance to a second VPN instance in the first network device, where the routing information of the first VPN instance corresponds to a first ERT in the first VPN instance, and the first ERT matches an IRT in the second VPN instance; and a second importing module configured to import, by the first network device, the routing information of the first VPN instance from the second VPN instance to a third VPN instance in the first network device.

Optionally, the second importing module is further configured to: determine, by the first network device, a second ERT in the second VPN instance, where the second ERT corresponds to the routing information of the first VPN instance in the second VPN instance; and import, by the first network device, based on that the second ERT matches an IRT in the third VPN instance, the routing information of the first VPN instance in the second VPN instance to the third VPN instance.

Optionally, the second importing module is further configured to: determine, by the first network device, based on obtained attribute information, routing information that is in the second VPN instance and that matches the attribute information, where the routing information that is in the second VPN instance and that matches the attribute information includes routing information of the first VPN instance in the second VPN instance; and import, by the first network device, the routing information that is in the second VPN instance and that matches the attribute information from the second VPN instance to the third VPN instance.

Optionally, the attribute information includes a route type and an identifier of the second VPN instance. The second importing module is further configured to: determine, by the first network device, based on the route type and the identifier of the second VPN instance, the routing information that is in the second VPN instance and that matches the attribute information, where the routing information that is in the second VPN instance and that matches the attribute information includes one or more routes that are in the second VPN instance and that have the route type, and the one or more routes include the routing information of the first VPN instance.

Optionally, the first network device further includes an allowing module configured to: before the first network device imports the routing information of the first VPN instance from the second VPN instance to the third VPN instance, allow, by the first network device, according to obtained instructions, the routing information of the first VPN instance to be imported from the second VPN instance to the third VPN instance.

Optionally, the first network device further includes an adding module configured to: after the first network device imports the routing information of the first VPN instance from the second VPN instance to the third VPN instance, add, by the first network device, an importing tag corresponding to the routing information of the first VPN instance to the third VPN instance, where the importing tag indicates that the routing information of the first VPN instance in the third VPN instance is imported from a local VPN instance of the first network device.

Optionally, the first network device further includes a first determining module configured to: after the first network device adds an importing tag corresponding to the routing information of the first VPN instance to the third VPN instance, determine, by the first network device, based on the importing tag in the third VPN instance, not to import the routing information of the first VPN instance in the third VPN instance to the local VPN instance of the first network device.

Optionally, the first network device further includes: a second determining module configured to: after the first network device imports the routing information of the first VPN instance from the second VPN instance to the third VPN instance, determine, by the first network device, a third ERT in the third VPN instance, where the third ERT corresponds to the routing information of the first VPN instance in the third VPN instance; and a third determining module configured to determine, by the first network device, based on that the third ERT does not match any IRT in a local VPN instance of the first network device, not to import the routing information of the first VPN instance in the third VPN instance to the local VPN instance of the first network device.

Optionally, the first network device further includes a sending module configured to: after the first network device imports the routing information of the first VPN instance from the second VPN instance to the third VPN instance, send, by the first network device, the routing information of the first VPN instance in the third VPN instance to a third network device by using the third VPN instance, where the routing information of the first VPN instance in the third VPN instance corresponds to the third ERT in the third VPN instance, and the third ERT indicates that the third network device imports the routing information of the first VPN instance from the third VPN instance to a fourth VPN instance in the third network device.

Optionally, the sending module is further configured to send, by the first network device, based on an external advertisement function of the first network device, the routing information of the first VPN instance in the third VPN instance to the third network device by using the third VPN instance.

Alternatively, both the first network device and the second network device are PE devices.

Technical effects of various optional solutions of the third aspect are the same as technical effects of the various optional solutions of the first aspect. Details are not described herein again.

According to a fourth aspect, a first network device is provided, and the first network device includes: an importing module configured to import, by a first network device, routing information of a first VPN instance in the first network device from the first VPN instance to a second VPN instance in the first network device; and a sending module configured to send, by the first network device, the routing information of the first VPN instance in the second VPN instance to a second network device by using the second VPN instance, where the routing information of the first VPN instance in the second VPN instance corresponds to a first ERT in the second VPN instance, and the first ERT indicates that the second network device imports the routing information of the first VPN instance from the second VPN instance to a third VPN instance in the second network device.

Optionally, the importing module is further configured to: import, by the first network device 1700, based on that a second ERT in the first VPN instance matches an IRT in the second VPN instance, the routing information of the first VPN instance from the first VPN instance to the second VPN instance, where the second ERT corresponds the routing information of the first VPN instance in the first VPN instance; or determine, by the first network device, based on obtained attribute information, routing information that is in the first VPN instance and that matches the attribute information, and import the routing information that is in the first VPN instance and that matches the attribute information from the first VPN instance to the second VPN instance, where the routing information that is in the first VPN instance and that matches the attribute information includes routing information of the first VPN instance in the first VPN instance.

Optionally, the routing information of the first VPN instance is generated by the first VPN instance in the first network device; the routing information of the first VPN instance is learned by the first VPN instance in the first network device from a BGP peer of the first network device; or the routing information of the first VPN instance is imported by the first VPN instance in the first network device from a fourth VPN instance in a BGP EVPN peer of the first network device.

Optionally, the first network device further includes an allowing module configured to: before the first network device imports the routing information of the first VPN instance from the first VPN instance to the second VPN instance, allow, by the first network device, according to obtained instructions, the routing information of the first VPN instance to be imported from the first VPN instance to the second VPN instance.

Optionally, the first network device further includes an adding module configured to: after the first network device imports routing information of the first VPN instance from the first VPN instance to the second VPN instance, add, by the first network device, an importing tag corresponding to the routing information of the first VPN instance to the second VPN instance, where the importing tag indicates that the routing information of the first VPN instance in the second VPN instance is imported from a local VPN instance of the first network device.

Optionally, the first network device further includes a first determining module configured to: after the first network device adds the importing tag corresponding to the routing information of the first VPN instance to the second VPN instance, determine, by the first network device, based on the importing tag in the second VPN instance, not to import the routing information of the first VPN instance in the second VPN instance to the local VPN instance of the first network device.

Optionally, the first network device further includes: a second determining module configured to: after the first network device imports the routing information of the first VPN instance from the first VPN instance to the second VPN instance, determine, by the first network device, the first ERT in the second VPN instance; and a third determining module configured to determine, by the first network device, based on that the first ERT does not match any IRT in a local VPN instance of the first network device, not to import the routing information of the first VPN instance in the second VPN instance to the local VPN instance of the first network device.

Optionally, the sending module is further configured to send, by the first network device, based on an external advertisement function of the first network device, the routing information of the first VPN instance in the second VPN instance to the second network device by using the second VPN instance.

Alternatively, both the first network device and the second network device are PE devices.

Technical effects of various optional solutions of the fourth aspect are the same as technical effects of the various optional solutions of the second aspect. Details are not described herein again.

It should be noted that concepts such as the first, the second, the third, and the fourth in the third aspect are independent of concepts such as the first, the second, the third, and the fourth in the fourth aspect. The first network device in the third aspect and the first network device in the fourth aspect may not be a same network device, the first VPN instance in the third aspect and the first VPN instance in the fourth aspect may not be a same VPN instance, and the first ERT in the third aspect and the first ERT in the fourth aspect may not be a same ERT. The concepts of the second, the third, and the fourth are similar.

According to a fifth aspect, a network device is provided, including a memory and a processor.

The memory is configured to store a computer program.

The processor is configured to execute the computer program stored in the memory, so that the network device performs the route importing method according to any one of the first aspect or the optional manners of the first aspect, or performs the route importing method according to any one of the second aspect or the optional manners of the second aspect.

According to a sixth aspect, a computer-readable storage medium is provided. The computer-readable storage medium stores a computer program, and when the computer program is executed by a processor, a computer is enabled to perform the route importing method according to any one of the first aspect or the optional manners of the first aspect, or perform the route importing method according to any one of the second aspect or the optional manners of the second aspect.

According to a seventh aspect, a computer program product including instructions is provided. When the computer program product is run on a computer, the computer is enabled to perform the route importing method according to any one of the first aspect or the optional manners of the first aspect, or perform the route importing method according to any one of the second aspect or the optional manners of the second aspect.

According to an eighth aspect, a chip is provided. The chip includes a programmable logic circuit and/or program instructions. When the chip runs, the chip is configured to perform the route importing method according to any one of the first aspect or the optional manners of the first aspect, or perform the route importing method according to any one of the second aspect or the optional manners of the second aspect.

According to a ninth aspect, a communication system is provided. The communication system includes at least two network devices. A first network device in the at least two network devices is the network device provided in any one of the third aspect to the fifth aspect, and another network device in the at least two network devices is configured to send routing information to the first network device, or is configured to receive routing information sent by the first network device.

Optionally, the network device is a PE device.

The technical solutions provided in the present disclosure bring the following beneficial effects.

A route importing method, a device, and a system are provided in the present disclosure. A first network device first imports routing information of a first VPN instance in a second network device from a first VPN instance to a second VPN instance in a first network device. The first network device imports the routing information of the first VPN instance from the second VPN instance to a third VPN instance in the first network device, rather than separately importing the routing information of the first VPN instance from the first VPN instance to the second VPN instance and the third VPN instance. Therefore, mutual access of a large quantity of VPN instances between the first network device and the second network device can be implemented without configuring a large quantity of paired ERTs and IRTs in the first network device and the second network device. This helps simplify service logic and configuration, and can ensure service security by ensuring that different VPN instances are effectively isolated from each other, avoid a loop and spreading of a fault, and implement normal communication between VMs of different network devices. Application scenarios of route importing are wide. The route importing solution provided in the present disclosure may be applied to an EVPN three-segment virtual extensible local area network (VXLAN) network. In this route importing solution, mutual access between different VPN instances can be implemented without protocol extension, and configuration is flexible and simple. The route importing solution is easy to implement and control.

BRIEF DESCRIPTION OF DRAWINGS

FIG. 4 is a schematic diagram of local cross according to an embodiment of the present disclosure;

FIG. 5 is a schematic diagram of remote cross according to an embodiment of the present disclosure;

FIG. 6 is a flowchart of a route importing method according to an embodiment of the present disclosure;

FIG. 9 is a flowchart of importing route information of a first VPN instance from a second VPN instance to a third VPN instance according to an embodiment of the present disclosure;

FIG. 10 is another flowchart of importing route information of a first VPN instance from a second VPN instance to a third VPN instance according to an embodiment of the present disclosure;

FIG. 11 is a flowchart of determining not to import route information of a first VPN instance in a third VPN instance to a local VPN instance according to an embodiment of the present disclosure;

FIG. 12 is another flowchart of determining not to import route information of a first VPN instance in a third VPN instance to a local VPN instance according to an embodiment of the present disclosure;

FIG. 13 is a flowchart of another route importing method according to an embodiment of the present disclosure;

FIG. 14 is still another schematic diagram of route importing according to an embodiment of the present disclosure;

DESCRIPTION OF EMBODIMENTS

To make principles, technical solutions, and advantages of the present disclosure clearer, the following describes, with reference to accompanying drawings, a route importing method, a device, and a system provided in embodiments of the present disclosure.

It should be understood that "at least one" mentioned in this specification means one or more, and "a plurality of" means two or more. "At least two" means two or more. In the present disclosure, unless otherwise specified, "I" means or. For example, AB may represent A or B. A term "and/or" in this specification describes only an association relationship between associated objects and indicates that there may be three relationships. For example, A and/or B may represent the following three cases: only A exists, both A and B exist, and only B exists. In addition, for ease of clear description, in the present disclosure, terms such as "first", "second", and "third" are used to distinguish same items or similar items having basically same functions. A person skilled in the art may understand that the terms such as "first", "second", and "third" do not limit a quantity and an execution sequence.

Before embodiments of the present disclosure are described, an application scenario of embodiments of the present disclosure is first described.

The technical solutions provided in embodiments of the present disclosure may be applied to an EVPN network. For example, the method may be applied to an EVPN segment VXLAN network. Typically, the EVPN segment VXLAN network may be an EVPN three-segment VXLAN network.

The EVPN network includes a plurality of PE devices, a communication connection is established between the PE devices, at least one VPN instance is configured in each PE device, and each PE device is connected to at least one user equipment. The VPN instance in each PE device corresponds to the at least one user equipment connected to the PE device, and each VPN instance is configured to forward a packet of corresponding user equipment, so as to implement communication between different user equipment. PE devices may be directly connected, or may be connected via another network device (for example, a core device). This is not limited in embodiments of the present disclosure. For example, the PE device may be a network device such as a router, a switch, a virtual router, or a virtual switch. The user equipment may be various types of devices such as a host, a user terminal, a server, or a VM created on a server.

Figure 1:
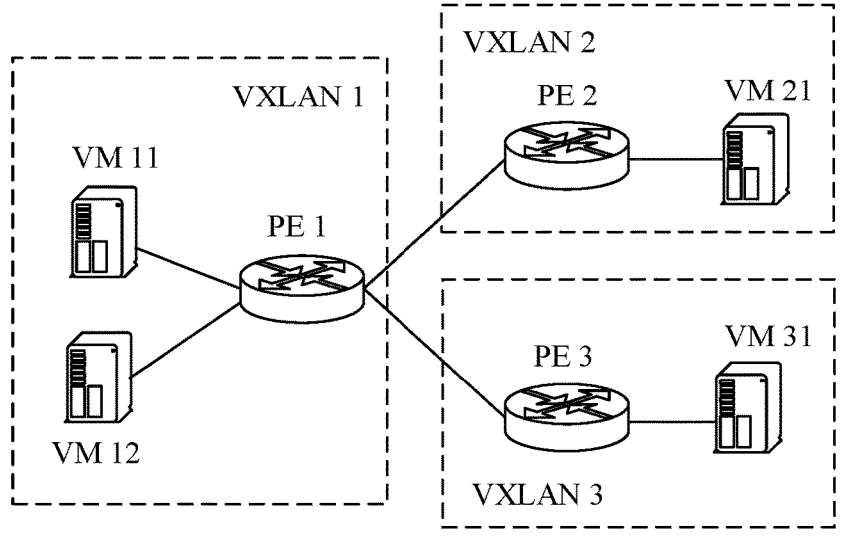
FIG. 1 is a schematic diagram of a structure of an EVPN network according to an embodiment of the present disclosure.

For example, FIG. 1 is a schematic diagram of a structure of an EVPN network according to an embodiment of the present disclosure. The EVPN network includes three PE devices: a PE 1, a PE 2, and a PE 3. The PE 2 and the PE 3 are separately connected to the PE 1, the PE 1 and the PE 2 are BGP EVPN peers of each other, and the PE 1 and the PE 3 are BGP EVPN peers of each other. The PE 1 is separately connected to a VM 11 and a VM 12, and at least one VPN instance (not shown in FIG. 1) corresponding to the VM 11 and the VM 12 is configured in the PE 1. The PE 2 is connected to a VM 21, and a VPN instance (not shown in FIG. 1) corresponding to the VM 21 is configured in the PE 2. The PE 3 is connected to a VM 31, and a VPN instance (not shown in FIG. 1) corresponding to the VM 31 is configured in the PE 3. Each VPN instance is configured to forward a packet of the corresponding VM to implement communication between different VMs. For example, a VPN instance that is in the PE 1 and that corresponds to the VM 11 forwards a packet of the VM 11 to a VPN instance that is in the PE 1 and that corresponds to the VM 12, and the VPN instance that is in the PE 1 and that corresponds to the VM 12 forwards the packet to the VM 12, so as to implement communication between the VM 11 and the VM 12. For another example, the VPN instance that is in the PE 1 and that corresponds to the VM 11 forwards a packet of the VM 11 to a VPN instance that is in the PE 2 and that corresponds to the VM 21, and the VPN instance that is in the PE 2 and that corresponds to the VM 21 forwards the packet to the VM 21, so as to implement communication between the VM 11 and the VM 21.

Usually, the EVPN network further includes an access device. The access device is connected to the PE device, and the user equipment is connected to the PE device via the access device. In other words, the user equipment is mounted to the access device, and is connected to the PE device via the access device. At least one VPN instance is also configured in the access device, and the VPN instance in each access device corresponds to at least one user equipment mounted to the access device. The access device may be a customer edge (CE) device. For example, the CE device may be a network device such as a router, a switch, a virtual router, or a virtual switch. For example, the CE device may be top of rack (TOR).

Figure 2:
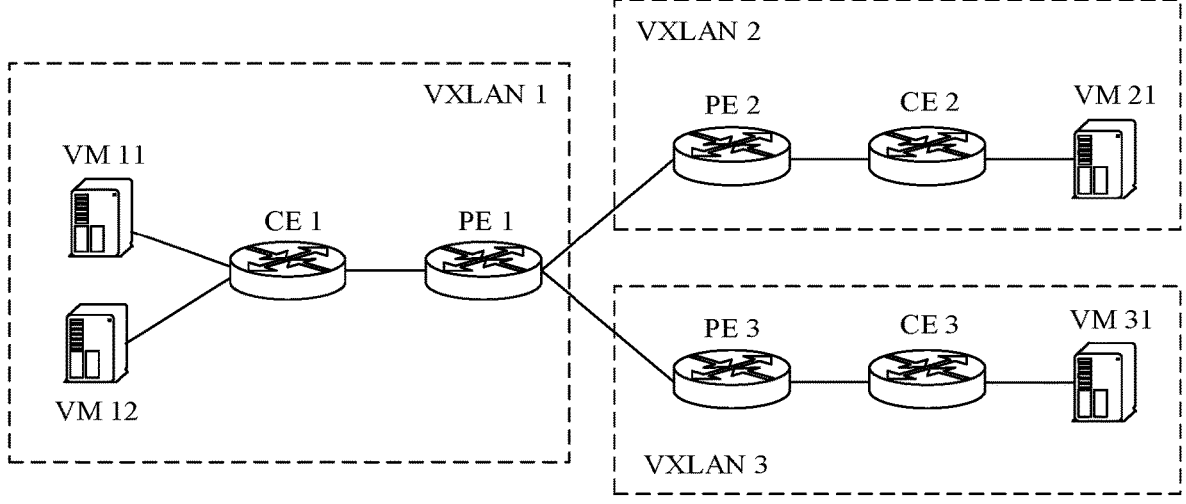
FIG. 2 is a schematic diagram of another structure of an EVPN network according to an embodiment of the present disclosure.

For example, FIG. 2 is a schematic diagram of another structure of the EVPN network according to an embodiment of the present disclosure. Based on FIG. 1, the EVPN network further includes three CE devices: a CE 1, a CE 2, and a CE 3. The CE 1 is connected to the PE 1, the VM 11 and the VM 12 are mounted to the CE 1, the VM 11 and the VM 12 may be connected to the PE 1 via the CE 1, and at least one VPN instance (not shown in FIG. 2) corresponding to the VM 11 and the VM 12 is configured in the CE 1. The CE 2 is connected to the PE 2, and the VM 21 is mounted to the CE 2 (e.g., the VM 21 is connected to the PE 2 via the CE 2). In addition, the CE 2 is configured with a VPN instance (not shown in FIG. 2) corresponding to the VM 21. The CE 3 is connected to the PE 3, the VM 31 is mounted to the CE 3 (e.g., the VM 31 is connected to the PE 3 via the CE 3), and the CE 3 is configured with a VPN instance (not shown in FIG. 2) corresponding to the VM 31. Each VPN instance is configured to forward a packet of the corresponding VM to implement communication between different VMs. For example, the VPN instance that is in the CE 1 and that corresponds to the VM 11 forwards the packet of the VM 11 to the VPN instance that is in the CE 1 and that corresponds to the VM 12, and the VPN instance that is in the CE 1 and that corresponds to the VM 12 forwards the packet to the VM 12, so as to implement communication between the VM 11 and the VM 12. For another example, the VPN instance corresponding to the VM 11 in the CE 1 forwards the packet of the VM 11 to the VPN instance corresponding to the VM 11 in the PE 1. The VPN instance corresponding to the VM 11 in the PE 1 forwards the packet to the VPN instance corresponding to the VM 21 in the PE 2. The VPN instance corresponding to the VM 21 in the PE 2 forwards the packet to the VPN instance corresponding to the VM 21 in the CE 2. The VPN instance corresponding to the VM 21 in the CE 2 forwards the packet to the VM 21, so as to implement communication between the VM 11 and the VM 21.

In the EVPN network, the access device may be directly connected to the PE device, or may be connected to the PE device via another network device. For example, the access device is connected to the PE device via a gateway (GW) device. If the access device is connected to the PE device via the GW device, at least one VPN instance may also be configured in the GW device, and the VPN instance in each GW device corresponds to at least one user equipment mounted to the access device that is connected with the GW device, so as to perform packet forwarding of the user equipment. The GW device may be a network device such as a router, a switch, a virtual router, or a virtual switch.

Figure 3:
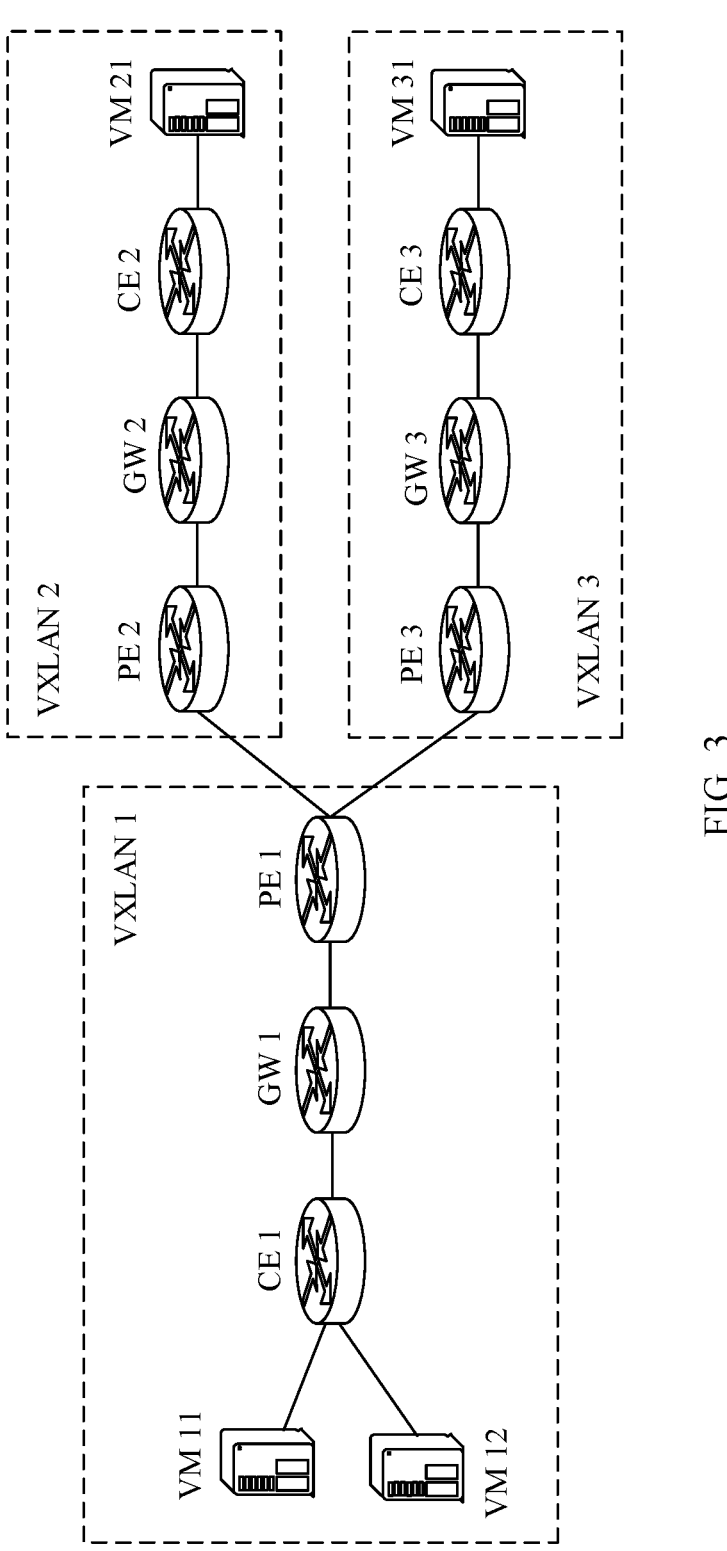
FIG. 3 is a schematic diagram of a structure of still another EVPN network according to an embodiment of the present disclosure.

For example, FIG. 3 is a schematic diagram of still another structure of the EVPN network according to an embodiment of the present disclosure. Based on FIG. 2, the EVPN network further includes three GW devices: a GW 1, a GW 2, and a GW 3. The GW 1 is separately connected to the CE 1 and the PE 1 (that is, the CE 1 is connected to the PE 1 via the GW 1), and at least one VPN instance (not shown in FIG. 3) corresponding to the VM 11 and the VM 12 is configured in the GW 1. The GW 2 is separately connected to the CE 2 and the PE 2 (that is, the CE 2 is connected to the PE 2 via the GW 2), and a VPN instance (not shown in FIG. 3) corresponding to a VM 21 is configured in the GW 2. The GW 3 is separately connected to the CE 3 and the PE 3 (that is, the CE 3 is connected to the PE 3 via the GW 3), and a VPN instance (not shown in FIG. 3) corresponding to the VM 31 is configured in the GW 3. Each VPN instance is configured to forward a packet of the corresponding VM to implement communication between different VMs. For example, the VPN instance corresponding to the VM 11 in the CE 1 forwards a packet of the VM 11 to the VPN instance corresponding to the VM 11 in the GW 1. The VPN instance corresponding to the VM 11 in the GW 1 forwards the packet to the VPN instance corresponding to the VM 11 in the PE 1. The VPN instance corresponding to the VM 11 in the PE 1 forwards the packet to the VPN instance corresponding to the VM 21 in the PE 2. The VPN instance corresponding to the VM 21 in the PE 2 forwards the packet to the VPN instance corresponding to the VM 21 in the GW 2. The VPN instance corresponding to the VM 21 in the GW 2 forwards the packet to the VPN instance corresponding to the VM 21 in the CE 2. The VPN instance corresponding to the VM 21 in the CE 2 forwards the packet to the VM 21, so as to implement communication between the VM 11 and the VM 21.

The EVPN network provided in embodiments of the present disclosure may be the EVPN segment VXLAN network. As shown in FIG. 1 to FIG. 3, the EVPN network includes three VXLAN networks: a VXLAN 1, a VXLAN 2, and a VXLAN 3. The PE 1, the CE 1, the GW 1, the VM 11, and the VM 12 belong to the VXLAN 1. The PE 2, the CE 2, the GW 2, and the VM 21 belong to the VXLAN 2. The PE 3, the CE 3, the GW 3, and the VM 31 belong to the VXLAN 3. A person skilled in the art may understand that the EVPN network shown in FIG. 1 to FIG. 3 is merely used as an example, but is not used to limit the technical solutions of embodiments of the present disclosure. In a specific implementation process, the PE device, the CE device, and the GW device may be configured as required. In addition, the EVPN network may further include another network device. For example, the EVPN network may further include a route reflector (RR). In addition, FIG. 2 and FIG. 3 are described by using an example in which the VM 11 and the VM 12 are connected to the PE 1 via a same CE device. In actual application, the VM 11 and the VM 12 are mounted to different CE devices that are connected to the PE 1. This is not limited in embodiments of the present disclosure.

In embodiments of the present disclosure, each VPN instance in the network device (including the PE device, the CE device, and the GW device) corresponds to a locally valid routing table on the network device, for example, a virtual routing and forwarding (VRF) table. Each VPN instance forwards a packet based on routing information recorded in the routing table of the VPN instance, to implement communication between different VMs. When VMs in two different VPN instances (where the two VPN instances may be located in a same network device or different network devices) need to communicate with each other, a route of one VPN instance may be imported to another VPN instance in a manner of route cross, so that route interworking between the two VPN instances is implemented. A route target (RT) is configured in each VPN instance, and the route target of the VPN instance may also be referred to as a vpn-target. RT is a BGP extended community attribute. Each VPN instance needs to be configured with two types of RT: an ERT and an IRT. Route cross means that a VPN instance is imported to another VPN instance in a manner of matching an ERT with an IRT. For example, an ERT in a VPN instance matches an IRT in another VPN instance (e.g., a value of the ERT in the VPN instance is equal to a value of the IRT in the another VPN instance), and a route of the VPN instance may be imported to the another VPN instance.

Route cross is classified into local cross and remote cross based on different route sources. In an example of local cross, a PE device matches an ERT in a local VPN instance with IRTs in other local VPN instances. If the ERT in the local VPN instance may match an IRT in a specific VPN instance in the other VPN instances, a BGP route of the VPN instance in which the ERT is located is written into a routing table of the matched VPN instance, so that the BGP route is imported to the matched VPN instance. In an example of remote cross, after learning a BGP EVPN route of a VPN instance of a remote PE device from the remote PE device, a PE device matches an ERT carried in the BGP EVPN route with IRTs in VPN instances of the PE device. If the ERT carried in the BGP EVPN route may match an IRT in a specific local VPN instance of the PE device, the BGP EVPN route is converted into a BGP route, and the BGP route is written into a routing table of a matched VPN instance, so that the BGP EVPN route is imported to the matched VPN instance.

In an example, FIG. 4 is a schematic diagram of local cross according to an embodiment of the present disclosure. Refer to FIG. 1. With reference to FIG. 1, two VPN instances VPN 11 and VPN 12 are configured in the PE 1, an ERT 1:1 and an IRT 1:1 are configured in the VPN 11, and an ERT 1:1 and an IRT 1:1 are configured in the VPN 12. It is assumed that the VM 11 is in the VPN 11, and the VM 12 is in the VPN 12. If the VM 11 and the VM 12 need to communicate with each other, route interworking between the VPN 11 and the VPN 12 needs to be implemented. As shown in FIG. 4, the ERT 1:1 in the VPN 11 matches the IRT 1:1 in the VPN 12, and the ERT 1:1 in the VPN 12 matches the IRT 1:1 in the VPN 11. Therefore, a route of the VPN 11 may be imported to the VPN 12, and a route of the VPN 12 may be imported to the VPN 11, so that the route interworking between the VPN 11 and the VPN 12 is implemented. In other words, the route interworking between the VPN 11 and the VPN 12 is implemented in a manner of local cross.

For example, FIG. 5 is a schematic diagram of remote cross according to an embodiment of the present disclosure. Refer to FIG. 5. With reference to FIG. 1 to FIG. 3, two VPN instances VPN 11 and VPN 12 are configured in the PE 1, an ERT 1:1, an IRT 1:1, and an IRT 2:2 are configured in the VPN 11, and an ERT 2:2, an IRT 1:1, and an IRT 2:2 are configured in the VPN 12. A VPN instance VPN 21 is configured in the PE 2, and an ERT 1:1 and an IRT 1:1 are configured in the VPN 21. A VPN instance VPN 31 is configured in the PE 3, and an ERT 2:2 and an IRT 2:2 are configured in the VPN 31. It is assumed that the VM 11 is in the VPN 11, the VM 12 is in the VPN 12, the VM 21 is in the VPN 21, and the VM 31 is in the VPN 31. If the VM 11 and the VM 21 need to communicate with each other, route interworking between the VPN 11 and the VPN 21 needs to be implemented. As shown in FIG. 5, the ERT 1:1 in the VPN 11 matches the IRT 1:1 in the VPN 21, and the ERT 1:1 in the VPN 21 matches the IRT 1:1 in the VPN 11. Therefore, a route of the VPN 11 may be imported to the VPN 21, and a route of the VPN 21 may be imported to the VPN 11, so that the route interworking between the VPN 11 and the VPN 21 is implemented. In other words, the route interworking between the VPN 11 and the VPN 21 is implemented in a manner of remote cross. If the VM 21 and the VM 12 need to communicate with each other, route interworking between the VPN 21 and the VPN 12 needs to be implemented. As shown in FIG. 5, the ERT 1:1 in the VPN 21 matches the IRT 1:1 in the VPN 12. Therefore, the route of the VPN 21 may be imported to the VPN 12. In other words, the route of the VPN 21 is imported to the VPN 12 in a manner of route cross. Similarly, if the VM 31 and the VM 11 need to communicate with each other, route interworking between the VPN 31 and the VPN 11 needs to be implemented. As shown in FIG. 5, the ERT 2:2 in the VPN 31 matches the IRT 2:2 in the VPN 11. Therefore, a route of the VPN 31 may be imported to the VPN 11. In other words, the route of the VPN 31 is imported to the VPN 11 in a manner of route cross. If the VM 12 and the VM 31 need to communicate with each other, route interworking between the VPN 12 and the VPN 31 needs to be implemented. As shown in FIG. 5, the ERT 2:2 in the VPN 12 matches the IRT 2:2 in the VPN 31, and the ERT 2:2 in the VPN 31 matches the IRT 2:2 in the VPN 12. Therefore, a route of the VPN 12 may be imported to the VPN 31, and the route of the VPN 31 may be imported to the VPN 12, so that the route interworking between the VPN 12 and the VPN 31 is implemented. In other words, the route interworking between the VPN 12 and the VPN 31 is implemented in a manner of remote cross.

It should be noted that in this embodiment of the present disclosure, local cross and remote cross are described by using an example in which the network device is the PE device. A person skilled in the art easily understands that any network device in the EVPN network may perform a local cross behavior, and any two connected network devices may perform a remote cross behavior. For example, the local cross behavior may be performed in the PE device, the CE device, or the GW device. The remote cross behavior may be performed between PE devices, between the CE device and the PE device, between the CE device and the GW device, or between the GW device and the PE device. This is not limited in this embodiment of the present disclosure. For example, as shown in FIG. 2, if the VM 11 needs to send a packet to the VM 21, the packet of the VM 11 is forwarded to the PE 1 by the VPN instance that is in the CE 1 and that corresponds to the VM 11, forwarded to the PE 2 by the VPN instance that is in the PE 1 and that is corresponding to the VM 11, forwarded to the CE 2 by the VPN instance that is in the PE 2 and that is corresponding to the VM 21, and forwarded to the VM 21 by the VPN instance that is in the CE 2 and that is corresponding to the VM 21. Therefore, the remote cross behavior needs to be performed between the CE 1 and the PE 1, between the PE 1 and the PE 2, and between the PE 2 and the CE 2, to implement route interworking between VPN instances. For another example, as shown in FIG. 3, if the VM 31 needs to send a packet to the VM 12, the packet of the VM 31 is forwarded to the GW 3 by the VPN instance that is in the CE 3 and that corresponds to the VM 31, forwarded to the PE 3 by the VPN instance that is in the GW 3 and that corresponds to the VM 31, forwarded to the PE 1 by the VPN instance that is in the PE 3 and that corresponds to the VM 31, forwarded to the GW 1 by the VPN instance that is in the PE 1 and that corresponds to the VM 12, forwarded to the CE 1 by the VPN instance that is in the GW 1 and that corresponds to the VM 12, and forwarded to the VM 12 by the VPN instance that is in the CE 1 and that corresponds to the VM 12. Therefore, the remote cross needs to be performed between the CE 3 and the GW 3, between the GW 3 and the PE 3, between the PE 3 and the PE 1, between the PE 1 and the GW 1, and between the GW 1 and the CE 1, to implement route interworking between VPN instances.

It should be noted that, in the EVPN network, there is a VPN instance that corresponds to a VM in a network device (for example, the CE device) directly connected to the VM, and the VM is mounted to the VPN instance. For a network device indirectly connected to the VM (for example, a network device connected to the VM via the CE device), a VPN instance that is in the network device and that corresponds to the VM may be determined in a manner of matching an ERT with an IRT. For example, as shown in FIG. 2, an ERT in the VPN instance that is in the CE 1 and that corresponds to the VM 11 may be matched with an IRT in the VPN instance in the PE 1, to determine the VPN instance that is in the PE 1 and that corresponds to the VM 11. For another example, as shown in FIG. 3, an ERT in the VPN instance that is in the CE 1 and that corresponds to the VM 11 may be matched with an IRT in the VPN instance in the GW 1, to determine the VPN instance that is in the GW 1 and that corresponds to the VM 11. Then, the ERT in the VPN instance that is in the GW 1 and that corresponds to the VM 11 is matched with an IRT in the VPN instances in the PE 1, to determine the VPN instance that is in the PE 1 and that corresponds to the VM 11.

As described above, it is easy to understand that in a remote cross scenario, to implement mutual access of a large quantity of VPN instances between a plurality of network devices (for example, PE devices), a large quantity of paired ERTs and IRTs need to be configured on the plurality of network devices. In this case, service logic and configurations become complex, effective isolation between VPN instances is easily damaged, service security cannot be ensured, and possibilities that a loop occurs and that a fault spreads are increased. In a local cross scenario, in an existing mechanism, route interworking between a local VPN instance and a remote VPN instance (which is a VPN instance in a remote PE) cannot be implemented, which affects normal communication between VMs connected to different PE devices. Consequently, application scenarios of route importing are limited. For example, in the remote cross scenario shown in FIG. 5, to implement mutual access between the VPN 21 in the PE 2 and the VPN 11 and the VPN 12 on the PE 1, the ERT 1:1 needs to be configured in the VPN 21 in the PE 2, and the IRT 1:1 needs to be configured in the VPN 11 and the VPN 12 in the PE 1. To implement mutual access between the VPN 31 in the PE 3 and the VPN 11 and the VPN 12 on the PE 1, the ERT 2:2 needs to be configured in the VPN 31 in the PE 3, and the IRT 2:2 needs to be configured in the VPN 11 and the VPN 12 on the PE 1. As a result, service logic and configurations are complex, effective isolation between VPN instances is easily damaged, service security cannot be ensured, and possibilities that a loop occurs and that a fault spreads are increased. In the local cross scenario shown in FIG. 4, only mutual access between the VPN 11 and the VPN 12 in the PE 1 may be implemented, and mutual access between the VPN 11 and the VPN 12 in the PE 1 and a VPN 21 in a remote PE 2 cannot be implemented. This affects normal communication between the VM 11 mounted to the VPN 11 and a VM 21 mounted to the VPN 21, and affects normal communication between the VM 12 mounted to the VPN 12 and the VM 21 mounted to the VPN 21. Consequently, application scenarios of route importing are limited.

In view of this, embodiments of the present disclosure provide a route importing method, a device, and a system. In technical solutions provided in embodiments of the present disclosure, mutual access of a large quantity of VPN instances between a plurality of network devices may be implemented without configuring a large quantity of paired ERTs and IRTs. This helps simplify service logic and configuration, and can ensure service security by ensuring that different VPN instances are effectively isolated from each other, avoid a loop and spreading of a fault, and implement normal communication between VMs of different network devices. In addition, application scenarios of route importing are wide. The following describes the technical solutions of the present disclosure in detail.

It should be noted that concepts such as the first, the second, the third, and the fourth in any following embodiment are independent of concepts such as the first, the second, the third, and the fourth in another embodiment. For example, a first network device in an embodiment and a first network device in another embodiment may not be a same network device, a first VPN instance in an embodiment and a first VPN instance in another embodiment may not be a same VPN instance, and a first ERT in an embodiment and a first ERT in another embodiment may not be a same ERT. The concepts of the second, the third, and the fourth are similar. Specific concepts are described in the following embodiments one by one.

FIG. 6 is a flowchart of a route importing method according to an embodiment of the present disclosure. The route importing method may be performed by a first network device in an EVPN network. The first network device may be a PE device, or may be a CE device or a GW device. As shown in FIG. 6, the method may include the following steps.

Step 601: A first network device imports routing information of a first VPN instance in a second network device from the first VPN instance to a second VPN instance in the first network device, where the routing information of the first VPN instance corresponds to a first ERT in the first VPN instance, and the first ERT matches an IRT in the second VPN instance.

Optionally, both the first network device and the second network device are PE devices, the second network device may be a remote device of the first network device, and the first network device and the second network device are BGP EVPN peers of each other. For example, as shown in FIG. 1 to FIG. 3, the first network device may be the PE 1, and the second network device may be the PE 2.

In an EVPN network, at least one VPN instance is configured in each network device (for example, a PE device, a CE device, or a GW device), and each VPN instance corresponds to a locally valid routing table on a network device in which the VPN instance is located. The routing table may be, for example, a VRF table, and a route in each VPN instance is recorded in the routing table corresponding to the VPN instance. As network devices in the EVPN network, the first network device and the second network device are separately configured with at least one VPN instance. The first VPN instance may be any VPN instance in the second network device. The routing information of the first VPN instance is information in a route of the first VPN instance. The routing information of the first VPN instance may be information in one or more routes belonging to the first VPN instance, to be specific, when one or more routes in the first VPN instance of the second network device are imported to the second VPN instance of the first network device, the routing information of the first VPN instance is also imported to the second VPN instance, where the routing information is related information in the one or more routes. In this embodiment of the present disclosure, the routing information of the first VPN instance may be generated by the first VPN instance in the second network device; the routing information of the first VPN instance may be learned by the first VPN instance from a BGP peer of the second network device; or the routing information of the first VPN instance is imported by the first VPN instance from a BGP EVPN peer of the second network device. This is not limited in this embodiment of the present disclosure.

In the EVPN network, at least one ERT and at least one IRT are configured for each VPN instance in the network device. The routing information of the first VPN instance in the second network device is located in the first VPN instance. The routing information of the first VPN instance in the first VPN instance corresponds to the first ERT in the first VPN instance (where for example, the routing information of the first VPN instance carries the first ERT.) The first network device may import the routing information of the first VPN instance from the first VPN instance to the second VPN instance in the first network device in a manner of remote route cross. Optionally, the first network device determines, based on the first ERT that corresponds to the routing information of the first VPN instance in the first VPN instance and that is in the first VPN instance and from VPN instances in the first network device, a VPN instance whose IRT matches the first ERT. The first network device determines the VPN instance whose IRT matches the first ERT and that is in the VPN instances in the first network device as the second VPN instance in the first network device. The first network device imports the routing information of the first VPN instance from the first VPN instance to the second VPN instance. For example, the first network device duplicates the routing information of the first VPN instance from the first VPN instance to a routing table of the second VPN instance.

Figure 7:
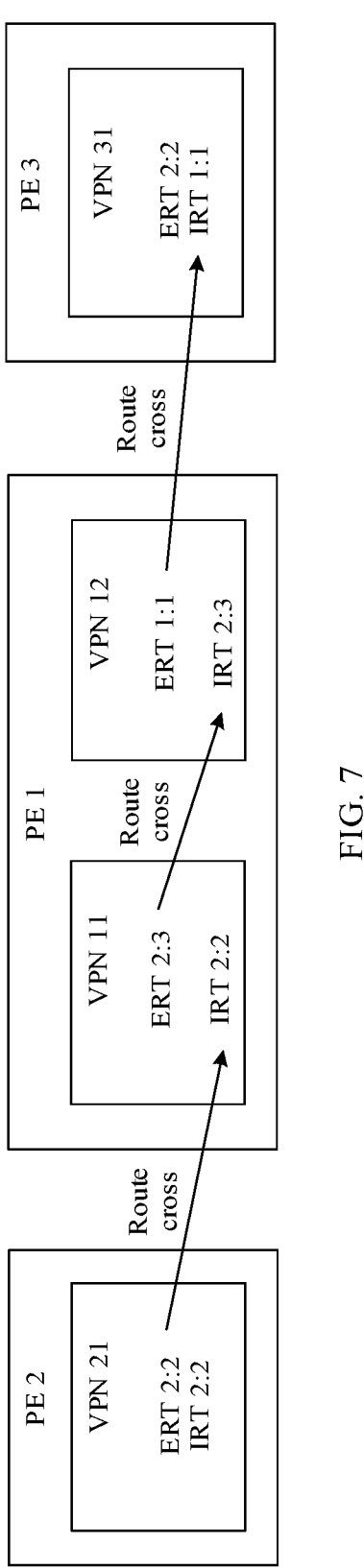
FIG. 7 is a schematic diagram of route importing according to an embodiment of the present disclosure.
Figure 8:
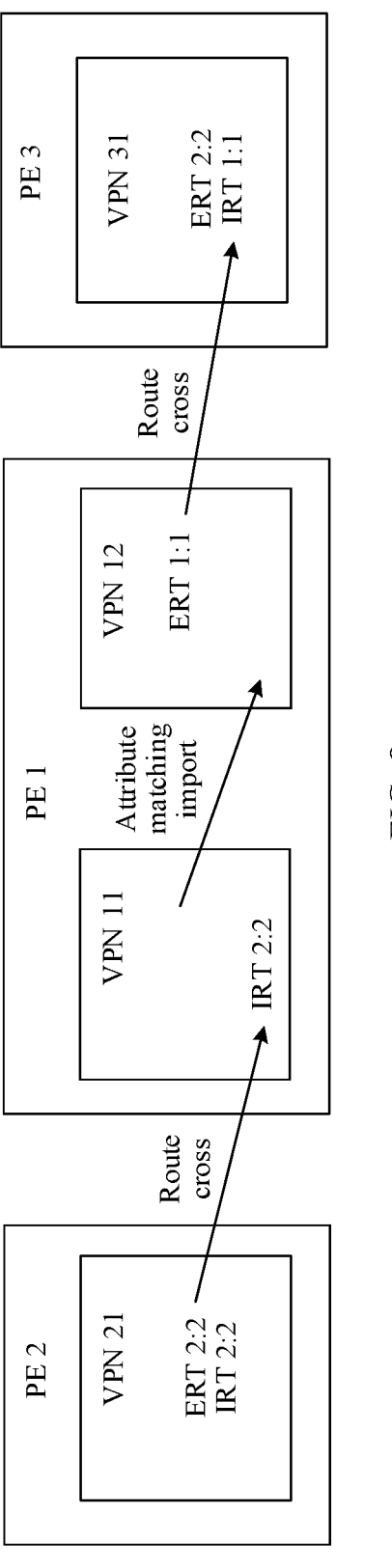
FIG. 8 is another schematic diagram of route importing according to an embodiment of the present disclosure.

Refer to FIG. 7 and FIG. 8. FIG. 7 and FIG. 8 are schematic diagrams of two types of route importing according to an embodiment of the present disclosure. A first network device is a PE 1, and a second network device is a PE 2. Two VPN instances, namely, a VPN 11 and a VPN 12, are configured in the PE 1. One VPN instance, namely, a VPN 21, is configured in the PE 2. An IRT 2:2 is configured in the VPN 11, and an ERT 2:2 and an IRT 2:2 are configured in the VPN 21. It is assumed that the VPN 21 in the PE 2 is a first VPN instance, a first ERT in the VPN 21 is the ERT 2:2, routing information of the VPN 21 recorded in the VPN 21 includes A1 (e.g., routing information of the first VPN instance recorded in the first VPN instance includes A1), and the routing information A1 of the VPN 21 corresponds to the ERT 2:2. The PE 1 may import the routing information A1 of the VPN 21 from the VPN 21 to a second VPN instance of the PE 1 in a manner of remote route cross. Specifically, the PE 1 determines, from the VPN instances of the PE 1, a VPN instance whose IRT matches the ERT 2:2. As shown in FIG. 7 and FIG. 8, the IRT 2:2 of the VPN 11 in the PE 1 matches the ERT 2:2 of the VPN 21 in the PE 2. Therefore, the PE 1 determines the VPN 11 as the second VPN instance, and the PE 1 duplicates the routing information A1 of the VPN 21 from the VPN 21 to a routing table of the VPN 11.

Step 602: The first network device imports the routing information of the first VPN instance from the second VPN instance in the first network device to a third VPN instance in the first network device.

After importing the routing information of the first VPN instance from the first VPN instance to the second VPN instance, the first network device may import the routing information of the first VPN instance from the second VPN instance to the third VPN instance in the first network device. Therefore, mutual access of a large quantity of VPN instances between the first network device and the second network device can be implemented without configuring a large quantity of paired ERTs and IRTs in the first network device and the second network device. This helps simplify service logic and configuration. The third VPN instance may be any VPN instance other than the second VPN instance in the first network device. For example, as shown in FIG. 7 and FIG. 8, the second VPN instance is the VPN 11 in the PE 1 (the first network device), and the third VPN instance may be the VPN 12 in the PE 1.

In this embodiment of the present disclosure, the first network device may import the routing information of the first VPN instance from the second VPN instance to the third VPN instance in a manner of route cross. Alternatively, the first network device may import the routing information of the first VPN instance from the second VPN instance to the third VPN instance in a manner of attribute matching. According to different manners for route importing, the step 602 may include two possible implementations. The following describes the two implementations in detail.

First implementation: The first network device imports the routing information of the first VPN instance from the second VPN instance in the first network device to the third VPN instance in the first network device in the manner of route cross.

FIG. 9 is a flowchart in which the first network device imports the route information of the first VPN instance from the second VPN instance to the third VPN instance according to an embodiment of the present disclosure. Refer to FIG. 9. The method may include the following sub steps.

Substep 6021*a*: The first network device determines a second ERT in the second VPN instance in the first network device, where the second ERT corresponds to the routing information of the first VPN instance in the second VPN instance.

The second ERT may be any ERT in the second VPN instance. The routing information of the first VPN instance in the second VPN instance refers to routing information of the first VPN instance recorded (or stored) in the second VPN instance. As described above, it is easy to understand that the routing information of the first VPN instance in the second VPN instance is route information of the first VPN instance that is imported from the remote first VPN instance, and the routing information of the first VPN instance in the second VPN instance is obtained by performing import processing on the routing information of the first VPN instance in the first VPN instance.

After importing the routing information of the first VPN instance from the first VPN instance of the second network device to the local second VPN instance, the first network device allocates an ERT from an ERT configured in the second VPN instance, and associates the allocated ERT with the routing information of the first VPN instance in the second VPN instance, so that the ERT, as the second ERT, corresponds to the routing information of the first VPN instance in the second VPN instance. Alternatively, the first network device generates a new ERT in the second VPN instance, and associates the generated ERT with the routing information of the first VPN instance in the second VPN instance, so that the ERT, as the second ERT, corresponds to the routing information of the first VPN instance in the second VPN instance. This is not uniquely limited in this embodiment of the present disclosure.

For example, as shown in FIG. 7, the first VPN instance is the VPN 21 in the PE 2, the second VPN instance is the VPN 11 in the PE 1, and the second ERT may be an ERT 2:3 in the VPN 11. The ERT 2:3 corresponds to the routing information of the VPN 21 in the VPN 11, to be specific, the ERT 2:3 corresponds to the routing information of the VPN 21 recorded (or stored) in the VPN 11. For example, the routing information of the VPN 21 in the VPN 21 includes A1. The routing information A1 corresponds to the ERT 2:2 in the VPN 21 of the PE 2, and is imported by the VPN 11 of the PE 1 to the VPN 11 by using the IRT 2:2 that matches the ERT 2:2. In other words, the VPN 11 also includes the routing information A1 after performing route importing, and the PE 1 allocates the corresponding ERT 2:3 to the routing information A1 in the VPN 11.

Substep 6022*a*: The first network device imports, based on that the second ERT in the second VPN instance in the first network device matches an IRT in the third VPN instance in the first network device, the routing information of the first VPN instance in the second VPN instance to the third VPN instance.

Optionally, the first network device determines, based on the second ERT in the second VPN instance in the first network device and from VPN instances in the first network device, a VPN instance whose IRT matches the second ERT. The first network device determines the VPN instance whose IRT matches the second ERT and that is in the VPN instances in the first network device as the third VPN instance. The first network device imports the routing information of the first VPN instance from the second VPN instance to the third VPN instance. For example, the first network device duplicates the routing information of the first VPN instance from the second VPN instance to a routing table of the third VPN instance.

For example, as shown in FIG. 7, the first network device is the PE 1. The VPN 11 and the VPN 12 in the PE 1 are two VPN instances in the PE 1. The VPN 11 is the second VPN instance, and the second ERT in the VPN 11 is the ERT 2:3. An IRT 2:3 and an IRT 1:1 are configured in the VPN 12. The PE 1 determines, in VPN instances in the PE 1, the VPN instance whose IRT matches the ERT 2:3 (namely, the second ERT). The IRT 2:3 in the VPN 12 matches the ERT 2:3 in the VPN 11. Therefore, the PE 1 determines the VPN 12 as the third VPN instance, and the PE 1 imports the routing information of the VPN 21 from the VPN 11 to the VPN 12. It can be learned from the descriptions of the substep 6021*a* that the routing information of the VPN 21 in the VPN 11 is A1. Therefore, the PE 1 imports the routing information A1 from the VPN 11 to the VPN 12.

It should be noted that, in the first implementation, the routing information of the first VPN instance is imported from the second VPN instance to the third VPN instance in the manner of route cross. An actual meaning of the route cross is that the ERT matches the IRT. That the routing information of the first VPN instance is imported from the second VPN instance to the third VPN instance in the manner of route cross means that the routing information of the first VPN instance is imported from the second VPN instance to the third VPN instance in a manner of matching the ERT with the IRT. In the first implementation, both the second VPN instance and the third VPN instance are located in the first network device. Therefore, route cross provided in the first implementation is local cross.

Second implementation: The first network device imports the routing information of the first VPN instance from the second VPN instance in the first network device to the third VPN instance in the first network device in the manner of attribute matching.

FIG. 10 is another flowchart in which the first network device imports the route information of the first VPN instance from the second VPN instance to the third VPN instance according to an embodiment of the present disclosure. Refer to FIG. 10. The method may include the following sub steps.

Substep 6021*b*: The first network device determines, based on obtained attribute information, routing information that is in the second VPN instance in the first network device and that matches the attribute information, where the routing information that is in the second VPN instance and that matches the attribute information includes routing information of the first VPN instance in the second VPN instance.

The first network device may configure the attribute information, so that the first network device may import, based on the attribute information, a route that is in the second VPN instance and that matches the attribute information to the third VPN instance. For example, the attribute information may be configured in the second VPN instance, and is used to match a route having an attribute identified by the attribute information. For example, if one or more routes to which the routing information of the first VPN instance belongs are all routes having an attribute identified by the attribute information, the first network device may determine, in a manner of attribute matching, that the routing information that is in the second VPN instance and that matches the attribute information includes the routing information of the first VPN instance in the second VPN instance.

Optionally, the attribute information is configured by operation and maintenance personnel in the first network device in a manner of command line. The attribute information may include a route type (route type) and an identifier of the second VPN instance. The route type may be, for example, a BGP route or a static route. The identifier of the second VPN instance may be a name of the second VPN instance, or a unique serial number of each VPN instance in the first network device. The identifier of the second VPN instance may be a serial number of the second VPN instance. The first network device may determine, based on the route type and the identifier of the second VPN instance and in a manner of attribute matching, the routing information that is in the second VPN instance and that matches the attribute information, where the routing information that is in the second VPN instance and that matches the attribute information may belong to one or more routes that are in the second VPN instance and that have the route type. For example, the first network device first determines the second VPN instance in the first network device based on the identifier of the second VPN instance in the attribute information. The first network device then determines, based on the route type in the attribute information, the one or more routes having the route type in the second VPN instance, and determines the one or more routes having the route type in the second VPN instance as a route that matches the attribute information, where the one or more routes include the routing information of the first VPN instance.

Substep 6022*b*: The first network device imports the routing information that is in the second VPN instance in the first network device and that matches the attribute information from the second VPN instance to the third VPN instance in the first network device.

Optionally, the first network device determines a VPN instance that is in the first network device and that is of a to-be-imported route as the third VPN instance, and duplicates routing information that is in the second VPN instance in the first network device and that matches the obtained attribute information to the routing table of the third VPN instance from the second VPN instance. The routing information that is in the second VPN instance and that matches the attribute information includes routing information of the first VPN instance in the second VPN instance. Therefore, by performing the substep 6022*b*, the first network device can import the routing information of the first VPN instance in the second VPN instance to the third VPN instance.

For example, as shown in FIG. 8, the first network device is the PE 1, the VPN 11 is the second VPN instance, and the VPN 12 is the third VPN instance. The PE 1 imports, in the manner of attribute matching, routing information that is in the VPN 11 and that matches the obtained attribute information from the VPN 11 to the VPN 12. The routing information that is in the VPN 11 and that matches the obtained attribute information includes the routing information A1 of the VPN 21 in the VPN 11. Therefore, by performing the substep 6022*b*, the PE 1 imports the routing information A1 of the VPN 21 in the VPN 11 from the VPN 11 to the VPN 12.

It should be noted that the two implementations provided in the step 602 are merely examples. The first network device may alternatively import the routing information of the first VPN instance from the second VPN instance to the third VPN instance in another implementation. Details are not described herein in this embodiment of the present disclosure.

In conclusion, according to the route importing method provided in this embodiment of the present disclosure, the first network device first imports the routing information of the first VPN instance in the second network device from the first VPN instance to the second VPN instance in the first network device. Then, the first network device imports the routing information of the first VPN instance from the second VPN instance to the third VPN instance in the first network device, rather than separately importing the routing information of the first VPN instance from the first VPN instance to the second VPN instance and the third VPN instance. Therefore, mutual access of a large quantity of VPN instances between the first network device and the second network device can be implemented without configuring a large quantity of paired ERTs and IRTs in the first network device and the second network device. This helps simplify service logic and configuration, and can ensure service security by ensuring that different VPN instances are effectively isolated from each other, avoid a loop and spreading of a fault, and implement normal communication between VMs of different network devices. Application scenarios of route importing are wide. The route importing method provided in this embodiment of the present disclosure may be applied to an EVPN three-segment VXLAN network. In this route importing method, mutual access between different VPN instances can be implemented without protocol extension, and configuration is flexible and simple, and is easy to implement and control.

In this embodiment of the present disclosure, in a possible implementation, before the first network device imports the routing information of the first VPN instance from the second VPN instance in the first network device to the third VPN instance in the first network device, the method further includes: the first network device allows, according to obtained instructions, the routing information of the first VPN instance to be imported from the second VPN instance in the first network device to the third VPN instance in the first network device. This step may include the following two implementations, which are described in detail below.

Implementation (1): A first enabling switch is configured in the first network device, and the first enabling switch may be a general enabling switch in the first network device. The first network device allows, based on a status of the first enabling switch, the routing information of the first VPN instance to be imported from the second VPN instance in the first network device to the third VPN instance in the first network device.

Optionally, the first enabling switch is used by the first network device to determine whether mutual route importing between VPN instances of the first network device is allowed to be performed. When the first enabling switch is in an enabled state, the first network device determines that mutual route importing between the VPN instances of the first network device is allowed to be performed. When the first enabling switch is in a disabled state, the first network device determines that the mutual route importing between the VPN instances of the first network device is not allowed to be performed.

The first network device may obtain the status of the first enabling switch. If the first enabling switch is in an enabled state, the first network device allows the routing information of the first VPN instance to be imported from the second VPN instance to the third VPN instance. If the first enabling device is in a disabled state, the first network device does not allow the routing information of the first VPN instance to be imported from the second VPN instance to the third VPN instance. For example, as shown in FIG. 7 and FIG. 8, if a first enabling switch in the PE 1 is in an enabled state, the PE 1 allows the routing information of the VPN 21 (namely, the first VPN instance) to be imported from the VPN 11 (namely, the second VPN instance) to the VPN 12 (namely, the third VPN instance).

Implementation (2): A second enabling switch is configured in the first network device, and the second enabling switch may be a VPN enabling switch. The first network device allows, based on a status of the second enabling switch, the routing information of the first VPN instance to be imported from the second VPN instance in the first network device to the third VPN instance in the first network device.

Optionally, the second enabling switch is located in the second VPN instance. The second enabling switch is used by the first network device to determine whether mutual route importing between the second VPN instance and the third VPN instance is allowed to be performed, or whether mutual route importing between the second VPN instance and all or some other VPN instances in the first network device is allowed to be performed, where the all or some VPN instances include the third VPN instance. In this way, when the second enabling switch is in an enabled state, the first network device determines to allow the mutual route importing between the second VPN instance and the third VPN instance to be performed. When the second enabling switch is in a disabled state, the first network device determines not to allow the mutual route importing between the second VPN instance and the third VPN instance to be performed. The second enabling switch is located in the second VPN instance (namely, a VPN instance of a source end of route importing). Optionally, the second enabling switch may alternatively be located in the third VPN instance (namely, a VPN instance of a destination end of route importing). When the second enabling switch is in the third VPN instance, the second enabling switch may be used by the first network device to determine whether the mutual route importing between some or all other VPN instances and the third VPN instance is allowed to be performed, where the some or all other VPN instances include the second VPN instance. For example, as shown in FIG. 7 and FIG. 8, the second enabling switch may be located in the VPN 11 (namely, the second VPN instance), and the second enabling switch is used by the PE 1 to determine whether mutual route importing between the VPN 11 and the VPN 12 (namely, the third VPN instance) is allowed to be performed, or whether mutual route importing between the VPN 11 and all or some other VPN instances in the PE 1 is allowed to be performed, where the all or some VPN instances include the VPN 12. Alternatively, the second enabling switch may be located in the VPN 12 (namely, the third VPN instance), and the second enabling switch may be used by the PE 1 to determine whether the mutual route importing between some or all other VPN instances and the VPN 12 is allowed to be performed, where the some or all other VPN instances include the VPN 11 (namely, the second VPN instance).

Optionally, the second enabling switch is located in the second VPN instance. The second enabling switch is used by the first network device to determine whether the route in the second VPN instance is allowed to be imported to the third VPN instance, or whether the route in the second VPN instance is allowed to be imported to all or some VPN instances in the first network device is allowed to be performed, where the all or some VPN instances include the third VPN instance. In this way, when the second enabling switch is in an enabled state, the first network device determines to allow the route in the second VPN instance to be imported to the third VPN instance. When the second enabling switch is in a disabled state, the first network device determines not to allow the route in the second VPN instance to be imported to the third VPN instance. The second enabling switch is located in the second VPN instance (namely, a VPN instance of a source end of route importing). Optionally, the second enabling switch may alternatively be located in the third VPN instance (namely, a VPN instance of a destination end of route importing). When the second enabling switch is in the third VPN instance, the second enabling switch may be used by the first network device to determine whether a route in some or all other VPN instances is allowed to be imported to the third VPN instance, where the some or all other VPN instances include the second VPN instance. For example, as shown in FIG. 7 and FIG. 8, the second enabling switch may be located in the VPN 11 (namely, the second VPN instance), and the second enabling switch is used by the PE 1 to determine whether a route in the VPN 11 is allowed to be imported to the VPN 12 (namely, the third VPN instance), or whether a route in the VPN 11 is allowed to be imported to all or some other VPN instances in the PE 1, where the all or some VPN instances include the VPN 12 (namely, the third VPN instance). Alternatively, the second enabling switch is in the VPN 12 (namely, the third VPN instance), and the second enabling switch is used by the PE 1 to determine whether a route in some or all other VPN instances is allowed to be imported to the VPN 12, where the some or all other VPN instances include the VPN 11.

Optionally, when the second enabling switch is located in the second VPN instance or the third VPN instance, in a specific implementation of the second enabling switch, the second enabling switch maintains a mutual route import table. The mutual route import table records all or some VPN instances in the first network device, where the all or some VPN instances include the second VPN instance and the third VPN instance. Route importing between the VPN instances in the mutual route import table may be performed. When the mutual route import table indicates that the second enabling switch is in an enabled state for mutual route importing between the second VPN instance and the third VPN instance, the first network device determines that the routing information of the first VPN instance is allowed to be imported from the second VPN instance to the third VPN instance. In another specific implementation of the second enabling switch, a correspondence between VPN instances is maintained in the second enabling switch. Mutual route importing may be performed between each VPN instance and a corresponding VPN instance recorded in the correspondence. The correspondence includes a correspondence between the second VPN instance and the third VPN instance, and the correspondence indicates that the second enabling switch is in an enabled state for mutual route importing between the second VPN instance and the third VPN instance. The first network device determines that the routing information of the first VPN instance is allowed to be imported from the second VPN instance to the third VPN instance.

Optionally, when the second enabling switch is located in the second VPN instance, in a specific implementation of the second enabling switch, the second enabling switch maintains a route importing table. The route importing table records all or some VPN instances in the first network device, where the all or some VPN instances include the third VPN instance. The route in the second VPN instance may be imported to the VPN instances recorded in the route importing table. The route importing table indicates that the second enabling switch is in an enabled state for importing the route in the second VPN instance to the third VPN instance. The first network device determines that the routing information of the first VPN instance is allowed to be imported from the second VPN instance to the third VPN instance.

Optionally, when the second enabling switch is located in the third VPN instance, in a specific implementation of the second enabling switch, the second enabling switch maintains a route exporting table. The route exporting table records all or some VPN instances in the first network device, where the all or some VPN instances include the second VPN instance. A route in the VPN instances recorded in the route exporting table may be imported to the second VPN instance. The route exporting table indicates that the second enabling switch is in an enabled state for importing the route in the second VPN instance to the third VPN instance. The first network device determines that the routing information of the first VPN instance is allowed to be imported from the second VPN instance to the third VPN instance.

A person skilled in the art easily understands that the descriptions about internal implementation of the second enabling switch herein are merely an example. In actual application, the second enabling switch may be implemented in another manner. For example, in an implementation of the second enabling switch, the second enabling switch records all or some VPN instances in the first network device and an enabling flag bit corresponding to each VPN instance. A value of the enabling flag bit indicates whether to enable a corresponding VPN instance to perform route importing or exporting. The first network device determines, based on the value of the enabling flag bit, whether route importing or exporting is allowed to be performed by the corresponding VPN instance. The value of the enabling flag bit may be configured, modified, and updated, so that the second enabling switch may enable route importing or exporting of different VPN instances at a same moment, and the second enabling switch may enable route importing or exporting of a same VPN instance at different moments. In addition, it should be noted that the foregoing solutions of the first enabling switch and the second enabling switch are merely examples. The first network device may alternatively allow the routing information of the first VPN instance to be imported from the second VPN instance in the first network device to the third VPN instance in the first network device in another implementation. This is not limited in this embodiment of the present disclosure.

In this embodiment of the present disclosure, in a possible implementation, after the first network device imports the routing information of the first VPN instance from the second VPN instance in the first network device to the third VPN instance in the first network device, the method further includes: the first network device determines not to import the routing information of the first VPN instance in the third VPN instance to a local VPN instance in the first network device. In this way, that the routing information imported from the second VPN instance to the third VPN instance is imported back to the second VPN instance again can be avoided, so as to avoid a routing loop and avoid too much same routing information being stored in one VPN instance. The routing information of the first VPN instance in the third VPN instance is routing information of the first VPN instance recorded (or stored) in the third VPN instance, the routing information of the first VPN instance in the third VPN instance is imported from the second VPN instance, and the routing information of the first VPN instance in the third VPN instance is obtained by performing import processing on the routing information of the first VPN instance in the second VPN instance. For example, as shown in FIG. 7 and FIG. 8, the VPN 12 is the third VPN instance, and the VPN 12 imports the routing information A1 of the remote VPN 21 (namely, the first VPN instance) by using the local VPN 11.

Optionally, the first network device may determine, in a manner of adding an importing tag, that the routing information of the first VPN instance in the third VPN instance is not imported to the local VPN instance of the first network device anymore. Alternatively, the first network device may determine, based on a configuration of an ERT and an IRT, that the routing information of the first VPN instance in the third VPN instance is not imported to the local VPN instance of the first network device anymore. Correspondingly, that the first network device determines not to import the routing information of the first VPN instance in the third VPN instance to the local VPN instance of the first network device includes the following two possible implementations. Details are described below.

First implementation: The first network device determines, in the manner of adding an importing tag, not to import the routing information of the first VPN instance in the third VPN instance in the first network device to the local VPN instance of the first network device.

FIG. 11 is a flowchart in which the first network device determines not to import the route information of the first VPN instance in the third VPN instance to the local VPN instance according to an embodiment of the present disclosure. As shown in FIG. 11, the method may include the following steps.

Step S11: The first network device adds an importing tag corresponding to the routing information of the first VPN instance to the third VPN instance in the first network device, where the importing tag indicates that the routing information of the first VPN instance in the third VPN instance is imported from the local VPN instance of the first network device.

After the first network device imports the routing information of the first VPN instance from the second VPN instance in the first network device to the third VPN instance in the first network device, the first network device may add the importing tag corresponding to the routing information of the first VPN instance to the third VPN instance, where the importing tag indicates that the routing information of the first VPN instance in the third VPN instance is imported from the local VPN instance of the first network device, and the importing tag may be local-import or local-crossed. Optionally, one or more importing fields corresponding to the routing information of the first VPN instance exist in the routing table of the third VPN instance, and the one or more importing fields may respectively correspond to one or more routes to which the routing information of the first VPN instance belongs. The first network device may add the importing tag to the one or more importing fields. For example, the first network device configures a value of the one or more importing fields to 1, so as to add the importing tag to the importing fields.

For example, as shown in FIG. 7 and FIG. 8, the VPN 12 is the third VPN instance, the routing information of the VPN 21 (namely, the first VPN instance) in the VPN 12 is A1, and the PE 1 adds, to the VPN 12, local-import corresponding to the routing information A1, to indicate that the routing information A1 in the VPN 12 is imported from a local VPN instance of the PE 1.

Step S12: The first network device determines, based on the importing tag in the third VPN instance in the first network device, not to import the routing information of the first VPN instance in the third VPN instance to the local VPN instance of the first network device.

Optionally, the first network device detects whether the importing tag corresponding to the routing information of the first VPN instance in the third VPN instance exists in the third VPN instance. If the importing tag exists in a route corresponding to the routing information of the first VPN instance in the third VPN instance, it indicates that the routing information of the first VPN instance in the third VPN instance is imported from the local VPN instance of the first network device, and the first network device determines not to import the routing information of the first VPN instance in the third VPN instance to the local VPN instance of the first network device. If the importing tag does not exist in some routes in the third VPN instance, it indicates that the routes in the third VPN instance are not imported from the local VPN instance of the first network device, and the first network device may allow the routes in the third VPN instance to be imported to the local VPN instance of the first network device.

For example, as shown in FIG. 7 and FIG. 8, the VPN 12 is the third VPN instance, and the routing information of the VPN 21 (namely, the first VPN instance) in the VPN 12 is A1. The PE 1 may detect whether the local-import corresponding to the routing information A1 exists in the VPN 12. If the local-import corresponding to the routing information A1 exists in the VPN 12, the PE 1 determines not to import the routing information A1 to the local VPN instance of the PE 1. If the local-import corresponding to the routing information A1 does not exist in the VPN 12, the PE 1 determines that the routing information A1 may be imported to the local VPN instance of the PE 1. It can be learned from descriptions of the step S11 that the local-import corresponding to the routing information A1 exists in the VPN 12. Therefore, the PE 1 determines not to import the routing information A1 to the local VPN instance of the PE 1 again.

Second implementation: The first network device determines, based on the configuration of an ERT and an IRT, not to import the routing information of the first VPN instance in the third VPN instance in the first network device to the local VPN instance of the first network device.

FIG. 12 is another flowchart in which the first network device determines not to import the route information of the first VPN instance in the third VPN instance to the local VPN instance according to an embodiment of the present disclosure. As shown in FIG. 12, the method may include the following steps.

Step S21: The first network device determines a third ERT in the third VPN instance in the first network device, where the third ERT corresponds to the routing information of the first VPN instance in the third VPN instance.

For an implementation of the step S21, refer to the foregoing substep 6021a. Details are not described herein again.

For example, as shown in FIG. 7 and FIG. 8, the third VPN instance is the VPN 12 in the PE 1, the third ERT is the ERT 1:1 in the VPN 12, the routing information of the VPN 21 (namely, the first VPN instance) in the VPN 12 is A1, and the ERT 1:1 corresponds to the routing information A1 of the VPN 21 recorded in the VPN 12.

It can be learned from the foregoing descriptions that, the routing information A1 is separately imported to the VPN 11 and the VPN 12 of the PE 1 by the VPN 21 of the PE 2 in a manner of remote or local importing, where the routing information A1 corresponds to the ERT 2:2 in the VPN 21, corresponds to the ERT 2:3 in the VPN 11, and corresponds to the ERT 1:1 in VPN 12. After the routing information A1 is imported to the VPN instance, for example, the routing information A1 may separately correspond to one or more routes in a VRF 21 of the VPN 21, one or more routes in a VRF 11 of the VPN 11, and one or more routes in a VRF 12 of the VPN 12. One or more routes in the VRF 21, VRF 11, and VRF 12 may include different content, but all include the routing information A1.

Step S22: The first network device determines, based on that the third ERT in the third VPN instance in the first network device does not match any IRT in the local VPN instance of the first network device, not to import the routing information of the first VPN instance in the third VPN instance to the local VPN instance of the first network device.

Optionally, the third ERT in the third VPN instance that is of the first network device and that is determined by the first network device is an ERT that may be used only for remote importing in the third VPN instance. In this case, no IRT matching the third ERT is found in the local VPN instance in the first network device. As a result, the first network device determines that no VPN instance in which an IRT matches the third ERT exists in the first network device. Therefore, the first network device determines not to import the routing information of the first VPN instance in the third VPN instance to the local VPN instance of the first network device.

For example, as shown in FIG. 7 and FIG. 8, the third VPN instance is the VPN 12 in the PE 1, the third ERT is the ERT 1:1 in the VPN 12, and there is no VPN instance in which an IRT matches the ERT 1:1 in the PE 1. Therefore, the PE 1 determines not to import the routing information A1 of the VPN 21 (namely, the first VPN instance) in the VPN 12 to the local VPN instance of the PE 1.

It should be noted that the two implementations in which the first network device determines not to import the routing information of the first VPN instance in the third VPN instance to the local VPN instance provided in this embodiment of the present disclosure are merely examples. The first network device may alternatively determine, in another implementation, not to import the routing information of the first VPN instance in the third VPN instance to the local VPN instance. Details are not described in this embodiment of the present disclosure.

In this embodiment of the present disclosure, in a possible implementation, after the first network device imports the routing information of the first VPN instance from the second VPN instance of the first network device to the third VPN instance in the first network device, or after the first network device determines not to import the routing information of the first VPN instance in the third VPN instance to the local VPN instance, the method further includes: the first network device sends the routing information of the first VPN instance in the third VPN instance to a third network device by using the third VPN instance in the first network device, where the routing information of the first VPN instance in the third VPN instance corresponds to the third ERT in the third VPN instance, and the third ERT indicates that the third network device imports the routing information of the first VPN instance from the third VPN instance to a fourth VPN instance in the third network device. Optionally, the third network device is a PE device, the third network device may be a remote device of the first network device, and the first network device and the third network device are BGP EVPN peers of each other. For example, as shown in FIG. 1 to FIG. 3, the first network device may be the PE 1, and the third network device may be the PE 3.

Optionally, the first network device first determines the third ERT in the third VPN instance in the first network device, and then the first network device sends the routing information of the first VPN instance in the third VPN instance to the third network device by using the third VPN instance. Optionally, the first network device sends, based on an external advertisement function of the first network device, the routing information of the first VPN instance in the third VPN instance to the third network device by using the third VPN instance. Specifically, the first network device first detects whether the first network device has the external advertisement function. If the first network device has the external advertisement function, the first network device sends the routing information of the first VPN instance in the third VPN instance to the third network device by using the third VPN instance. If the first network device does not have the external advertisement function, the first network device does not send the routing information of the first VPN instance in the third VPN instance to the third network device. The external advertisement function may be config- ured by an operation and maintenance engineer in the first network device, or may be configured by a management device of the first network device in the first network device. That the first network device has the external advertisement function means that all VPN instances in the first network device have the external advertisement function. Optionally, it may be alternatively configured that a part of VPN instances in the first network device have the external advertisement function, and another part of VPN instances do not have the external advertisement function. For example, at least the third VPN instance in the first network device is configured to have the external advertisement function. This is not limited in this embodiment of the present disclosure.

After receiving the routing information of the first VPN instance in the third VPN instance sent by the first network device by using the third VPN instance of the first network device, the third network device imports the routing infor- mation of the first VPN instance in the third VPN instance to a fourth VPN instance of the third network device. Optionally, the routing information of the first VPN instance in the third VPN instance sent by the first network device to the third network device carries the third ERT. After receiv- ing the routing information, the third network device deter- mines, from a VPN instance in the third network device, a VPN instance in which an IRT matches the third ERT, determines the VPN instance in which the IRT matches the third ERT in the VPN instance in the third network device as the fourth VPN instance, and imports the routing infor- mation to the fourth VPN instance.

For example, as shown in FIG. 7 and FIG. 8, the first network device is the PE 1, the third network device is the PE 3, the third VPN instance is the VPN 12 in the PE 1, the third ERT is the ERT 1:1 in the VPN 12, the ERT 1:1 corresponds to the routing information A1 of the VPN 21 (namely, the first VPN instance) in the VPN 12, the fourth VPN instance is the VPN 31 in the PE 3, and the ERT 1:1 indicates that the PE 3 imports the routing information A1 of the VPN 21 from the VPN 12 to the VPN 31. After the PE 1 determines the ERT 1:1 in the VPN 12, if the PE 1 has the external advertisement function, the PE 1 sends the routing information A1 of the VPN 21 in the VPN 12 to the PE 3 by using the VPN 12, where the routing information A1 sent by the PE 1 to the PE 3 carries the ERT 1:1 (namely, the third ERT). After receiving the routing information A1, the PE 3 determines, based on the ERT 1:1 carried in the information A1, a VPN instance that is in the PE 3 and in which an IRT matches the ERT 1:1. As shown in FIG. 7 and FIG. 8, the VPN instance that is in the PE 3 and in which the IRT matches the ERT 1:1 is the VPN 31. Therefore, the PE 3 imports the routing information A1 to the VPN 31.

In conclusion, according to the route importing method provided in this embodiment of the present disclosure, the first network device first imports the routing information of the first VPN instance in the second network device from the first VPN instance to the second VPN instance in the first network device. Then, the first network device imports the routing information of the first VPN instance from the second VPN instance to the third VPN instance in the first network device, rather than separately importing the routing information of the first VPN instance from the first VPN instance to the second VPN instance and the third VPN instance. Therefore, mutual access of a large quantity of VPN instances between the first network device and the second network device can be implemented without config- uring a large quantity of paired ERTs and IRTs in the first network device and the second network device. This helps simplify service logic and configuration, and can ensure service security by ensuring that different VPN instances are effectively isolated from each other, avoid a loop and spreading of a fault, and implement normal communication between VMs of different network devices. Application scenarios of route importing are wide. The route importing method provided in this embodiment of the present disclo- sure may be applied to an EVPN three-segment VXLAN network. In this route importing method, mutual access between different VPN instances can be implemented with- out protocol extension, and configuration is flexible and simple. The route importing solution is easy to implement and control.

FIG. 13 is a flowchart of another route importing method according to an embodiment of the present disclosure. The route importing method may be performed by a first network device in an EVPN network. The first network device may be a PE device, or may be a CE device or a GW device. As shown in FIG. 13, the method may include the following steps.

Step 1301: A first network device imports routing infor- mation of a first VPN instance in the first network device from the first VPN instance to a second VPN instance in the first network device.

The first VPN instance and the second VPN instance may be any two VPN instances of the first network device. The routing information of the first VPN instance is information in one or more routes in the first VPN instance. The routing information of the first VPN instance may be generated by the first VPN instance; the routing information of the first VPN instance may be learned from a BGP peer of the first network device; or the routing information of the first VPN instance is imported from a fourth VPN instance of a BGP EVPN peer of the first network device. This is not uniquely limited in this embodiment of the present disclosure. In this embodiment of the present disclosure, the first network device may import the routing information of the first VPN instance from the first VPN instance to the second VPN instance in a manner of route cross. Alternatively, the first network device may import the routing information of the first VPN instance from the first VPN instance to the second VPN instance in a manner of attribute matching. According to different manners for route importing, the step 1301 may include two possible implementations.

First implementation: The first network device imports the routing information of the first VPN instance from the first VPN instance to the second VPN instance in the first network device in the manner of route cross.

Optionally, the first network device determines a second ERT in the first VPN instance in the first network device, where the second ERT corresponds to the routing information of the first VPN instance in the first VPN instance. Then, the first network device imports, based on that the second ERT in the first VPN instance matches an IRT in the second VPN instance, the routing information of the first VPN instance from the first VPN instance to the second VPN instance. For an implementation process of the first implementation, refer to the embodiment and related descriptions shown in FIG. 9. Details are not described again in this embodiment of the present disclosure.

For example, FIG. 14 is a schematic diagram of route importing according to an embodiment of the present disclosure. A first network device is a PE 1. Two VPN instances are configured in the PE 1, where the two VPN instances are a VPN 11 and a VPN 12, a first VPN instance is the VPN 11, and a second VPN instance is the VPN 12. Routing information (namely, routing information of the first VPN instance) of the VPN 11 in the VPN 11 includes B1, a second ERT is an ERT 1:1 in the VPN 11, and the routing information B1 corresponds to the ERT 1:1 in the VPN 11. The PE 1 imports, based on that the ERT 1:1 in the VPN 11 matches the IRT 1:1 in the VPN 12, the routing information B1 of the VPN 11 in the VPN 11 to the VPN 12.

It should be noted that, in the first implementation, both the first VPN instance and the second VPN instance are located in the first network device. Therefore, route cross provided in the first implementation is local cross.

Second implementation: The first network device imports the routing information of the first VPN instance from the first VPN instance to the second VPN instance in the first network device in the manner of attribute matching.

Optionally, the first network device determines, based on obtained attribute information, routing information that is in the first VPN instance and that matches the attribute information, and imports the routing information that is in the first VPN instance and that matches the attribute information from the first VPN instance to the second VPN instance, where the routing information that is in the first VPN instance and that matches the attribute information includes the routing information of the first VPN instance in the first VPN instance. For an implementation process of the second implementation, refer to the embodiment and related descriptions shown in FIG. 10. Details are not described again in this embodiment of the present disclosure.

Figure 15:
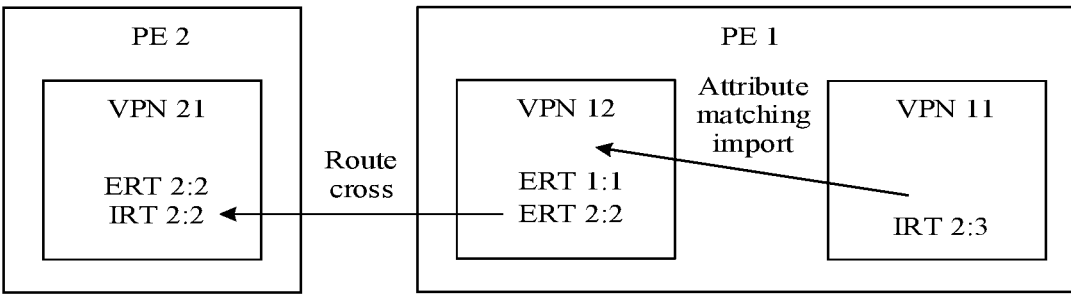
FIG. 15 is yet another schematic diagram of route importing according to an embodiment of the present disclosure.

For example, FIG. 15 is a schematic diagram of route importing according to an embodiment of the present disclosure. A first network device is a PE 1. Two VPN instances are configured in the PE 1, where the two VPN instances are a VPN 11 and a VPN 12, a first VPN instance is the VPN 11, and a second VPN instance is the VPN 12. Routing information (namely, routing information of the first VPN instance) of the VPN 11 in the VPN 11 includes B1. The PE 1 imports routing information that is in the VPN 11 and that matches the obtained attribute information from the VPN 11 to the VPN 12. The routing information that is in the VPN 11 and that matches the obtained attribute information includes the routing information B1 of the VPN 11 in the VPN 11. Therefore, the PE 1 imports the routing information B1 of the VPN 11 in the VPN 11 from the VPN 11 to the VPN 12 by using the second implementation.

Step 1302: The first network device sends the routing information of the first VPN instance in the second VPN instance to a second network device by using the second VPN instance in the first network device, where the routing information of the first VPN instance in the second VPN instance corresponds to a first ERT in the second VPN instance, and the first ERT indicates that the second network device imports the routing information of the first VPN instance from the second VPN instance to a third VPN instance in the second network device.

Optionally, the second network device is a PE device, the second network device may be a remote device of the first network device, and the first network device and the second network device are BGP EVPN peers of each other. For example, as shown in FIG. 1 to FIG. 3, the first network device may be the PE 1, and the second network device may be the PE 2.

Optionally, the first network device determines the first ERT in the second VPN instance in the first network device, where the first ERT corresponds to the routing information of the first VPN instance in the second VPN instance. The first ERT indicates that the second network device imports the routing information of the first VPN instance from the second VPN instance to the third VPN instance in the second network device. The first network device then sends the routing information of the first VPN instance in the second VPN instance to the second network device by using the second VPN instance. Optionally, the first network device sends, based on an external advertisement function of the first network device, the routing information of the first VPN instance in the second VPN instance to the second network device by using the second VPN instance. Specifically, the first network device first detects whether the first network device has the external advertisement function. If the first network device has the external advertisement function, the first network device sends the routing information of the first VPN instance in the second VPN instance to the second network device by using the second VPN instance. If the first network device does not have the external advertisement function, the first network device does not send the routing information of the first VPN instance in the second VPN instance to the second network device. The external advertisement function may be configured by an operation and maintenance engineer in the first network device, or may be configured by a management device of the first network device in the first network device. That the first network device has the external advertisement function means that all VPN instances in the first network device have the external advertisement function. Optionally, it may be alternatively configured that a part of VPN instances in the first network device have the external advertisement function, and another part of VPN instances do not have the external advertisement function. For example, at least the second VPN instance in the first network device is configured to have the external advertisement function. This is not limited in this embodiment of the present disclosure.

After receiving the routing information of the first VPN instance in the second VPN instance sent by the first network device by using the second VPN instance in the first network device, the second network device imports the routing information of the first VPN instance in the second VPN instance to the third VPN instance of the second network device. Optionally, the routing information of the first VPN instance in the second VPN instance sent by the first network device to the second network device carries the first ERT. After receiving the routing information, the second network device determines, from a VPN instance in the second network device, a VPN instance in which an IRT matches the first ERT, determines the VPN instance in which the IRT matches the first ERT in the VPN instance in the second network device as the third VPN instance, and imports the routing information to the third VPN instance.

For example, as shown in FIG. 14 and FIG. 15, the first network device is the PE 1, the second network device is the PE 2, the second VPN instance is the VPN 12 in the PE 1, the first ERT is the ERT 2:2 in the VPN 12, the ERT 2:2 corresponds to the routing information B1 of the VPN 11 (namely, the first VPN instance) in the VPN 12, the third VPN instance is the VPN 21 in the PE 2, and the ERT 2:2 indicates that the PE 2 imports the routing information B1 of the VPN 11 from the VPN 12 to the VPN 21. After the PE 1 determines the ERT 2:2 in the VPN 12, if the PE 1 has the external advertisement function, the PE 1 sends the routing information B1 of the VPN 11 in the VPN 12 to the PE 2 by using the VPN 12, where the routing information B1 sent by the PE 1 to the PE 2 carries the ERT 2:2 (namely, the first ERT). After receiving the routing information B1, the PE 2 determines, based on the ERT 2:2 carried in the information B1, a VPN instance that is in the PE 2 and in which an IRT matches the ERT 2:2. As shown in FIG. 14 and FIG. 15, the VPN instance that is in the PE 2 and in which the IRT matches the ERT 2:2 is the VPN 21. Therefore, the PE 2 imports the routing information B1 to the VPN 21.

In conclusion, according to the route importing method provided in this embodiment of the present disclosure, the first network device first imports the routing information of the first VPN instance in the first network device from the first VPN instance to the second VPN instance in the first network device. Then, the first network device sends the routing information of the first VPN instance in the second VPN instance to the second network device by using the second VPN instance. Therefore, mutual access of a large quantity of VPN instances between the first network device and the second network device can be implemented. This helps simplify service logic and configuration, and can ensure service security by ensuring that different VPN instances are effectively isolated from each other, and implement normal communication between VMs of different network devices. Application scenarios of route importing are wide. The route importing method provided in this embodiment of the present disclosure may be applied to an EVPN three-segment VXLAN network. In this route importing method, mutual access between different VPN instances can be implemented without protocol extension, and configuration is flexible and simple. The route importing solution is easy to implement and control.

In this embodiment of the present disclosure, in a possible implementation, before the first network device imports the routing information of the first VPN instance from the first VPN instance to the second VPN instance, the method further includes: The first network device allows, according to obtained instructions, the routing information of the first VPN instance to be imported from the first VPN instance to the second VPN instance. For an implementation process of this step, refer to the foregoing embodiment. This is not limited in this embodiment of the present disclosure.

For example, as shown in FIG. 14 and FIG. 15, the first network device is the PE 1. Two VPN instances are configured in the PE 1, where the two VPN instances are the VPN 11 and the VPN 12, the first VPN instance is the VPN 11, and the second VPN instance is the VPN 12. The PE 1 allows, according to the obtained instructions, the routing information B1 of the VPN 11 in the VPN 11 to be imported from the VPN 11 to the VPN 12.

In this embodiment of the present disclosure, in a possible implementation, after the first network device imports the routing information of the first VPN instance from the first VPN instance to the second VPN instance, the method further includes: The first network device determines not to import the routing information of the first VPN instance in the second VPN instance in the first network device to a local VPN instance of the first network device. In this way, that the routing information imported from the first VPN instance to the second VPN instance is imported back to the first VPN instance again can be avoided, so as to avoid a routing loop and avoid too much same routing information being stored in one VPN instance.

The routing information of the first VPN instance in the second VPN instance refers to routing information of the first VPN instance recorded (or stored) in the second VPN instance.

Optionally, the first network device may determine, in a manner of adding an importing tag, that the routing information of the first VPN instance in the second VPN instance is not imported to the local VPN instance of the first network device anymore. Alternatively, the first network device may determine, based on a configuration of an ERT and an IRT, that the routing information of the first VPN instance in the second VPN instance is not imported to the local VPN instance of the first network device anymore. Correspondingly, that the first network device determines not to import the routing information of the first VPN instance in the second VPN instance in the first network device to the local VPN instance of the first network device includes the following two possible implementations. Details are described below.

First implementation: The first network device determines, in the manner of adding an importing tag, not to import the routing information of the first VPN instance in the second VPN instance in the first network device to the local VPN instance of the first network device.

Optionally, the first network device adds an importing tag corresponding to the routing information of the first VPN instance to the second VPN instance, where the importing tag indicates that the routing information of the first VPN instance in the second VPN instance is imported from the local VPN instance of the first network device. The first network device determines, based on the importing tag in the second VPN instance, not to import the routing information of the first VPN instance in the second VPN instance to the local VPN instance of the first network device. For an implementation process of the first implementation, refer to the embodiment and related descriptions shown in FIG. 11. Details are not described again in this embodiment of the present disclosure.

For example, as shown in FIG. 14 and FIG. 15, the VPN 12 is the second VPN instance, the routing information of the VPN 11 (namely, the first VPN instance) in the VPN 12 is B1, and the PE 1 adds, to the VPN 12, an importing tag local-import corresponding to the routing information B1. The PE 1 determines, based on the importing tag local-import that is in the VPN 12 and that corresponds to the routing information B1, not to import the routing information B1 to a local VPN instance of the PE 1.

Second implementation: The first network device determines, based on the configuration of an ERT and an IRT, not to import the routing information of the first VPN instance in the second VPN instance in the first network device to the local VPN instance of the first network device.

Optionally, the first network device determines the first ERT in the second VPN instance, where the first ERT corresponds to the routing information of the first VPN instance in the second VPN instance. The first network device determines, based on that the first ERT in the second VPN instance does not match any IRT in the local VPN instance of the first network device, not to import the routing information of the first VPN instance in the second VPN instance to the local VPN instance of the first network device. For an implementation process of the second implementation, refer to the embodiment and related descriptions shown in FIG. 12. Details are not described again in this embodiment of the present disclosure.

For example, as shown in FIG. 14 and FIG. 15, the VPN 12 is the second VPN instance, the routing information of the VPN 11 (namely, the first VPN instance) in the VPN 12 is B1, and the PE 1 determines that the first ERT in the VPN 12 is the ERT 2:2, where the ERT 2:2 corresponds to the routing information B1 of the VPN 11 in the VPN 12. The PE 1 determines, based on that the ERT 2:2 does not match any IRT in the local VPN instance (for example, the VPN 11) of the PE 1, not to import the routing information B1 of the VPN 11 in the VPN 12 to the local VPN instance of the PE 1.

In conclusion, according to the route importing method provided in this embodiment of the present disclosure, the first network device first imports the routing information of the first VPN instance in the first network device from the first VPN instance to the second VPN instance in the first network device. Then, the first network device sends the routing information of the first VPN instance in the second VPN instance to the second network device by using the second VPN instance. Therefore, mutual access of a large quantity of VPN instances between the first network device and the second network device can be implemented. This helps simplify service logic and configuration, and can ensure service security by ensuring that different VPN instances are effectively isolated from each other, avoid a loop and spreading of a fault, and implement normal communication between VMs of different network devices. Application scenarios of route importing are wide. The route importing method provided in this embodiment of the present disclosure may be applied to an EVPN three-segment VXLAN network. In this route importing method, mutual access between different VPN instances can be implemented without protocol extension, and configuration is flexible and simple. The route importing solution is easy to implement and control.

The following provides apparatus embodiments of the present disclosure that may be used to execute the method embodiments of the present disclosure. For details not disclosed in the apparatus embodiments of the present disclosure, refer to the method embodiments of the present disclosure.

Figure 16:
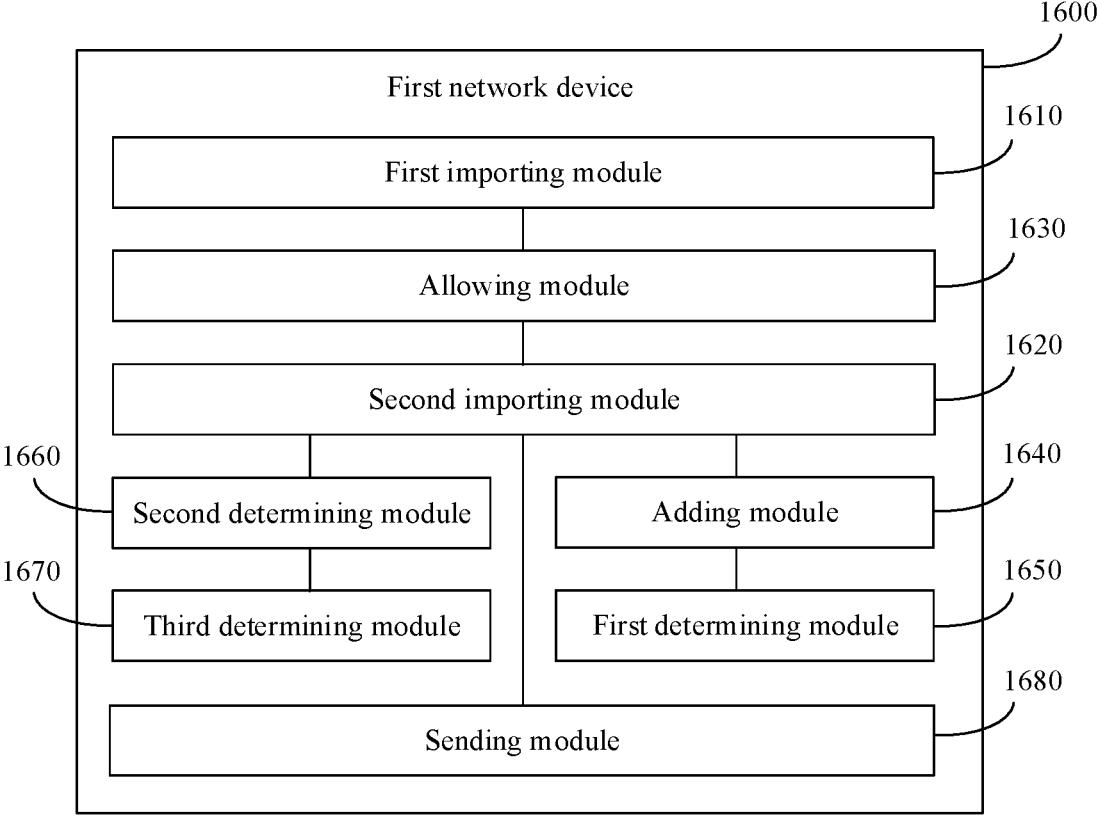
FIG. 16 is a schematic diagram of a logical structure of a first network device according to an embodiment of the present disclosure.

FIG. 16 is a schematic diagram of a logical structure of a first network device 1600 according to an embodiment of the present disclosure. Refer to FIG. 16. The first network device 1600 may include but is not limited to a first importing module 1610 and a second importing module 1620.

The first importing module 1610 is configured to import, by the first network device 1600, routing information of a first VPN instance in a second network device from the first VPN instance to a second VPN instance in the first network device 1600, where the routing information of the first VPN instance corresponds to a first ERT in the first VPN instance, and the first ERT matches an IRT in the second VPN instance. For a function implementation of the first importing module 1610, refer to related descriptions of the step 601.

The second importing module 1620 is configured to import, by the first network device 1600, the routing information of the first VPN instance from the second VPN instance to a third VPN instance in the first network device 1600. For a function implementation of the second importing module 1620, refer to related descriptions of the step 602.

Optionally, the second importing module 1610 is further configured to: determine, by the first network device 1600, a second ERT in the second VPN instance, where the second ERT corresponds to the routing information of the first VPN instance in the second VPN instance; and import, by the first network device 1600, based on that the second ERT matches an IRT in the third VPN instance, the routing information of the first VPN instance in the second VPN instance to the third VPN instance.

Optionally, the second importing module 1620 is further configured to: determine, by the first network device 1600, based on obtained attribute information, routing information that is in the second VPN instance and that matches the attribute information, where the routing information that is in the second VPN instance and that matches the attribute information includes routing information of the first VPN instance in the second VPN instance; and import, by the first network device 1600, the routing information that is in the second VPN instance and that matches the attribute information from the second VPN instance to the third VPN instance.

Optionally, the attribute information includes a route type and an identifier of the second VPN instance. The second importing module 1620 is further configured to: determine, by the first network device 1600, based on the route type and the identifier of the second VPN instance, the routing information that is in the second VPN instance and that matches the attribute information, where the routing information that is in the second VPN instance and that matches the attribute information includes one or more routes that are in the second VPN instance and that have the route type, and the one or more routes include the routing information of the first VPN instance.

Optionally, still refer to FIG. 16. The first network device 1600 further includes an allowing module 1630 configured to: before the first network device 1600 imports the routing information of the first VPN instance from the second VPN instance to the third VPN instance, allow, by the first network device 1600, according to obtained instructions, the routing information of the first VPN instance to be imported from the second VPN instance to the third VPN instance. For function implementation of the allowing module 1630, refer to related descriptions that the first network device allows the routing information of the first VPN instance to be imported from the second VPN instance to the third VPN instance in the foregoing method embodiment.

Optionally, still refer to FIG. 16. The first network device 1600 further includes an adding module 1640 configured to: after the first network device 1600 imports the routing information of the first VPN instance from the second VPN instance to the third VPN instance, add, by the first network device 1600, an importing tag corresponding to the routing information of the first VPN instance to the third VPN instance, where the importing tag indicates that the routing information of the first VPN instance in the third VPN instance is imported from a local VPN instance of the first network device 1600. For a function implementation of the adding module 1640, refer to related descriptions of the step S11.

Optionally, still refer to FIG. 16. The first network device 1600 further includes a first determining module 1650 configured to: after the first network device 1600 adds an importing tag corresponding to the routing information of the first VPN instance to the third VPN instance, determine, by the first network device 1600, based on the importing tag in the third VPN instance, not to import the routing information of the first VPN instance in the third VPN instance to the local VPN instance of the first network device 1600. For a function implementation of the first determining module 1650, refer to related descriptions of the step S12.

Optionally, Still refer to FIG. 16. The first network device 1600 further includes a second determining module 1660 and a third determining module 1670.

The second determining module 1660 is configured to: after the first network device 1600 imports the routing information of the first VPN instance from the second VPN instance to the third VPN instance, determine, by the first network device 1600, a third ERT in the third VPN instance, where the third ERT corresponds to the routing information of the first VPN instance in the third VPN instance. For a function implementation of the second determining module 1660, refer to related descriptions of the step S21.

The third determining module 1670 is configured to determine, by the first network device 1600, based on that the third ERT does not match any IRT in a local VPN instance of the first network device 1600, not to import the routing information of the first VPN instance in the third VPN instance to the local VPN instance of the first network device 1600. For a function implementation of the third determining module 1670, refer to related descriptions of the step S22.

Optionally, still refer to FIG. 16. The first network device 1600 further includes a sending module 1680 configured to: after the first network device 1600 imports the routing information of the first VPN instance from the second VPN instance to the third VPN instance, send, by the first network device 1600, the routing information of the first VPN instance in the third VPN instance to the third network device by using the third VPN instance, where the routing information of the first VPN instance in the third VPN instance corresponds to the third ERT in the third VPN instance, and the third ERT indicates that the third network device imports the routing information of the first VPN instance from the third VPN instance to a fourth VPN instance in the third network device. For function implementation of the sending module 1680, refer to related descriptions that the first network device sends the routing information of the first VPN instance in the third VPN instance to the third network device by using the third VPN instance in the foregoing method embodiment.

Optionally, the sending module 1680 is further configured to send, by the first network device 1600, based on an external advertisement function of the first network device 1600, the routing information of the first VPN instance in the third VPN instance to the third network device by using the third VPN instance.

Optionally, both the first network device 1600 and the second network device are PE devices.

In conclusion, for the first network device provided in this embodiment of the present disclosure, the first network device first imports the routing information of the first VPN instance in the second network device from the first VPN instance to the second VPN instance in the first network device. Then, the first network device imports the routing information of the first VPN instance from the second VPN instance to the third VPN instance in the first network device, rather than separately importing the routing information of the first VPN instance from the first VPN instance to the second VPN instance and the third VPN instance.

Therefore, mutual access of a large quantity of VPN instances between the first network device and the second network device can be implemented without configuring a large quantity of paired ERTs and IRTs in the first network device and the second network device. This helps simplify service logic and configuration, and can ensure service security by ensuring that different VPN instances are effectively isolated from each other, avoid a loop and spreading of a fault, and implement normal communication between VMs of different network devices. Application scenarios of route importing are wide. The route importing solution provided in this embodiment of the present disclosure may be applied to an EVPN three-segment VXLAN network. In this route importing solution, mutual access between different VPN instances can be implemented without protocol extension, and configuration is flexible and simple. The route importing solution is easy to implement and control.

Figure 17:
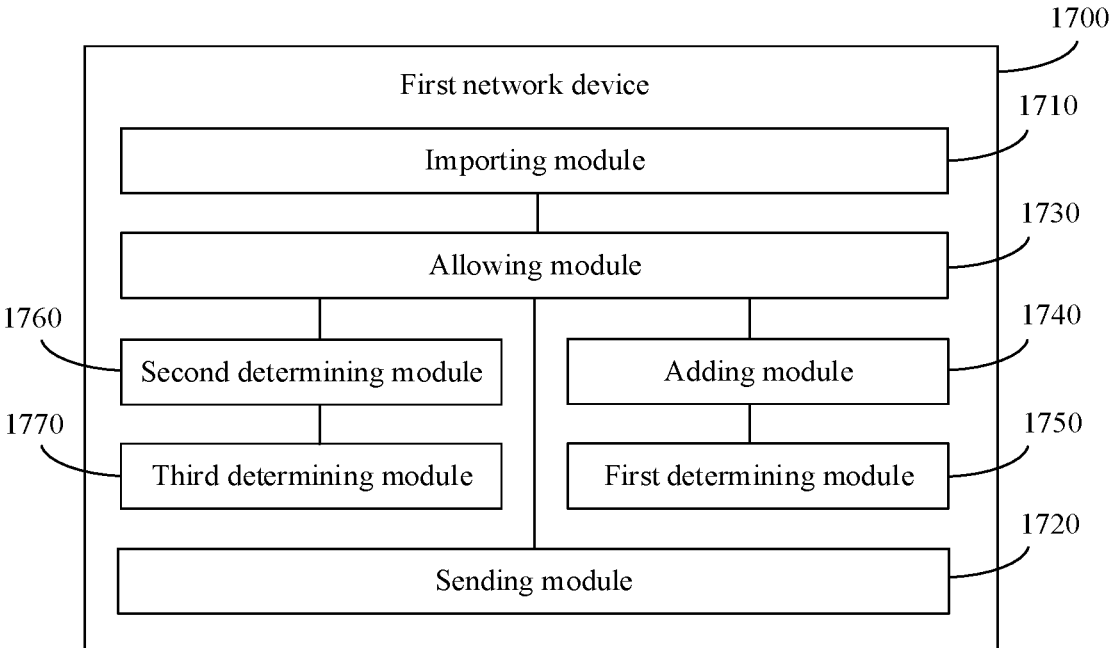
FIG. 17 is a schematic diagram of a logical structure of another first network device according to an embodiment of the present disclosure.

FIG. 17 is a schematic diagram of a logical structure of another first network device 1700 according to an embodiment of the present disclosure. Refer to FIG. 17. The first network device 1700 may include but is not limited to an importing module 1710 and a sending module 1720.

The importing module 1710 is configured to import, by a first network device 1700, routing information of a first VPN instance in the first network device 1700 from the first VPN instance to a second VPN instance in the first network device 1700. For a function implementation of the importing module 1710, refer to related descriptions of the step 1301.

The sending module 1720 is configured to send, by the first network device 1700, the routing information of the first VPN instance in the second VPN instance to a second network device by using the second VPN instance, where the routing information of the first VPN instance in the second VPN instance corresponds to a first ERT in the second VPN instance, and the first ERT indicates that the second network device imports the routing information of the first VPN instance from the second VPN instance to a third VPN instance in the second network device. For a function implementation of the sending module 1720, refer to related descriptions of the step 1302.

Optionally, the importing module 1710 is further configured to: import, by the first network device 1700, based on that a second ERT in the first VPN instance matches an IRT in the second VPN instance, the routing information of the first VPN instance from the first VPN instance to the second VPN instance, where the second ERT corresponds the routing information of the first VPN instance in the first VPN instance; or determine, by the first network device 1700, based on obtained attribute information, routing information that is in the first VPN instance and that matches the attribute information, and import the routing information that is in the first VPN instance and that matches the attribute information from the first VPN instance to the second VPN instance, where the routing information that is in the first VPN instance and that matches the attribute information includes routing information of the first VPN instance in the first VPN instance.

Optionally, the routing information of the first VPN instance is generated by the first VPN instance in the first network device 1700; the routing information of the first VPN instance is learned by the first VPN instance in the first network device 1700 from a BGP peer of the first network device 1700; or the routing information of the first VPN instance is imported by the first VPN instance of the first network device 1700 from a fourth VPN instance in a BGP EVPN peer of the first network device 1700.

Optionally, still refer to FIG. 17. The first network device 1700 further includes an allowing module 1730 configured to: before the first network device 1700 imports the routing information of the first VPN instance from the first VPN instance to the second VPN instance, allow, by the first network device 1700, according to obtained instructions, the routing information of the first VPN instance to be imported from the first VPN instance to the second VPN instance. For function implementation of the allowing module 1730, refer to related descriptions that the first network device allows the routing information of the first VPN instance to be imported from the first VPN instance to the second VPN instance in the foregoing method embodiment.

Optionally, still refer to FIG. 17. The first network device 1700 further includes an adding module 1740 configured to: after the first network device 1700 imports routing information of the first VPN instance from the first VPN instance to the second VPN instance, add, by the first network device 1700, an importing tag corresponding to the routing information of the first VPN instance to the second VPN instance, where the importing tag indicates that the routing information of the first VPN instance in the second VPN instance is imported from a local VPN instance of the first network device 1700. For a function implementation of the adding module 1740, refer to related descriptions of the step S11.

Optionally, still refer to FIG. 17. The first network device 1700 further includes a first determining module 1750 configured to: after the first network device 1700 adds the importing tag corresponding to the routing information of the first VPN instance to the second VPN instance, determine, by the first network device 1700, based on the importing tag in the second VPN instance, not to import the routing information of the first VPN instance in the second VPN instance to the local VPN instance of the first network device 1700. For a function implementation of the first determining module 1750, refer to related descriptions of the step S12.

Optionally, Still refer to FIG. 17. The first network device 1700 further includes a second determining module 1760 and a third determining module 1770.

The second determining module 1760 is configured to: after the first network device 1700 imports the routing information of the first VPN instance from the first VPN instance to the second VPN instance, determine, by the first network device 1700, the first ERT in the second VPN instance. For a function implementation of the second determining module 1760, refer to related descriptions of the step S21.

The third determining module 1770 is configured to determine, by the first network device 1700, based on that the first ERT does not match any IRT in a local VPN instance of the first network device 1700, not to import the routing information of the first VPN instance in the second VPN instance to the local VPN instance of the first network device 1700. For a function implementation of the third determining module 1770, refer to related descriptions of the step S22.

Optionally, the sending module 1720 is further configured to send, by the first network device 1700, based on an external advertisement function of the first network device 1700, the routing information of the first VPN instance in the second VPN instance to the second network device by using the second VPN instance.

Optionally, both the first network device 1700 and the second network device are PE devices.

In conclusion, for the first network device provided in this embodiment of the present disclosure, the first network device first imports the routing information of the first VPN instance in the first network device from the first VPN instance to the second VPN instance in the first network device. Then, the first network device sends the routing information of the first VPN instance in the second VPN instance to the second network device by using the second VPN instance. Therefore, mutual access of a large quantity of VPN instances between the first network device and the second network device can be implemented without configuring a large quantity of paired ERTs and IRTs in the first network device and the second network device. This helps simplify service logic and configuration, and can ensure service security by ensuring that different VPN instances are effectively isolated from each other, avoid a loop and spreading of a fault, and implement normal communication between VMs of different network devices. Application scenarios of route importing are wide. The route importing solution provided in this embodiment of the present disclosure may be applied to an EVPN three-segment VXLAN network. In this route importing solution, mutual access between different VPN instances can be implemented without protocol extension, and configuration is flexible and simple. The route importing solution is easy to implement and control.

It should be understood that the network device in embodiments of the present disclosure may further be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, the route importing method provided in the foregoing method embodiments may be implemented by using software. When the packet sending method provided in the foregoing method embodiments is implemented by using software, the modules in the PE device may also be software modules or modules combining software and hardware.

Figure 18:
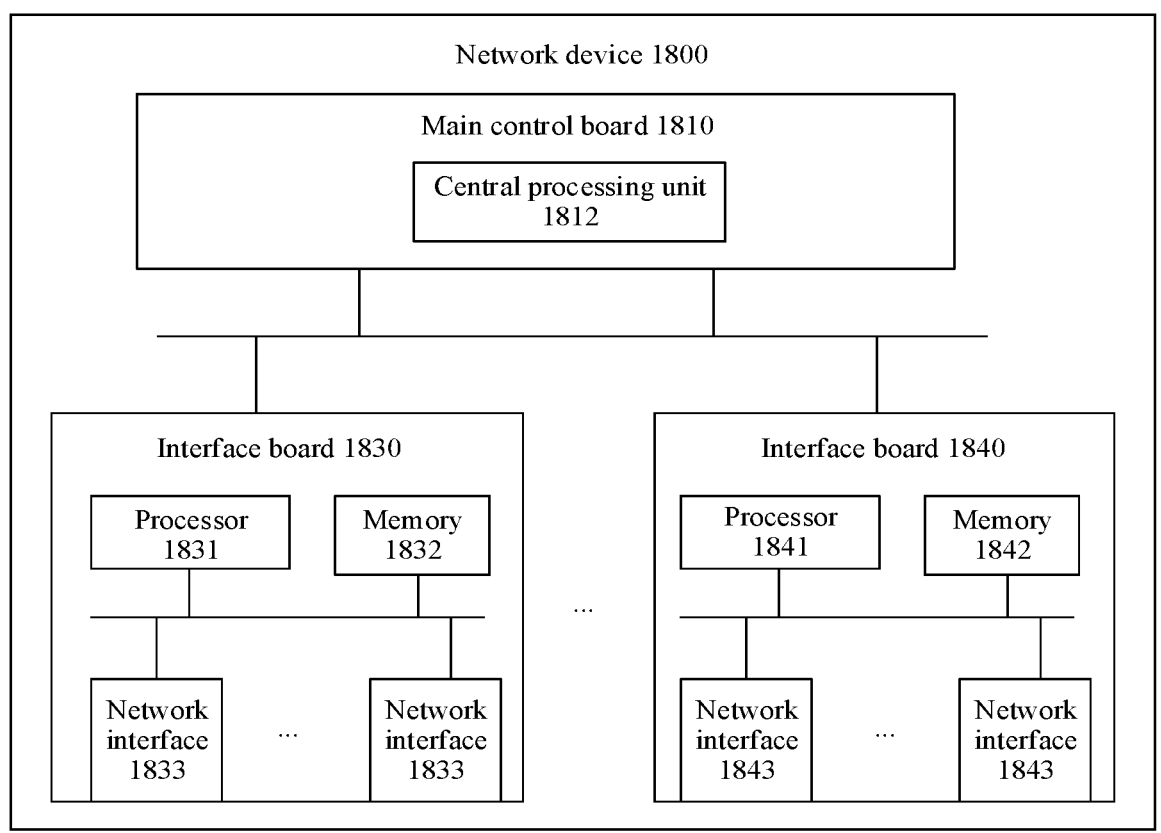
FIG. 18 is a schematic diagram of a hardware structure of a network device according to an embodiment of the present disclosure.

FIG. 18 is a schematic diagram of a hardware structure of a network device 1800 according to an embodiment of the present disclosure. The network device 1800 may be the first network device in any one of the foregoing embodiments. The network device 1800 may be a switch, a router, or another network device that forwards a packet. In this embodiment, the network device 1800 includes a main control board 1810, an interface board 1830, and an interface board 1840. When there are a plurality of interface boards, a switching board (not shown in the figure) may be included. The switching board is configured to complete data exchange between interface boards (the interface board is also referred to as a line card or a service board).

The main control board 1810 is configured to complete functions such as system management, device maintenance, and protocol processing. The interface board 1830 and the interface board 1840 are configured to provide various service interfaces (for example, a point of sale (POS) interface, a gigabit Ethernet (GE) interface, and an Asynchronous Transfer Mode (ATM) interface), and implement packet forwarding. The main control board 1810 mainly includes three types of functional units: a system management and control unit, a system clock unit, and a system maintenance unit. The main control board 1810, the interface board 1830, and the interface board 1840 are connected to a system backboard through a system bus to implement interworking.

The interface board 1830 includes one or more processors 1831. The processor 1831 is configured to control and manage the interface board, communicate with the central processing unit on the main control board, and import a route. The memory 1832 on the interface board 1830 is configured to store an ERT and an IRT of a VPN instance, and the processor 1831 performs route importing between VPN instances by searching the ERT and the IRT of the VPN instance that are stored in the memory 1832.

The interface board 1830 includes one or more network interfaces 1833, and is configured to receive routing information, and forward the routing information according to instructions of the processor 1831. Specific implementation processes are not described herein again. Specific functions of the processor 1831 are not described herein again.

It may be understood that, as shown in FIG. 18, this embodiment includes a plurality of interface boards, and uses a distributed forwarding mechanism. In this mechanism, operations on the interface board 1840 are basically similar to operations on the interface board 1830. For brevity, details are not described again. In addition, it may be understood that the processor 1831 in the interface board 1830 and/or the processor 1841 in the interface board 1840 in FIG. 18 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 1831 in the interface board 1830 and/or the processor 1841 in the interface board 1840 may also use a general-purpose processor, for example, a general-purpose CPU, to implement the functions described above.

In addition, it should be noted that there may be one or more main control boards, and when there are a plurality of main control boards, the main control boards may include a primary main control board and a secondary main control board. There may be one or more interface boards. A network device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the network device may not need the switching board, and the interface board provides a function of processing service data of an entire system. In a distributed forwarding architecture, the network device includes a plurality of interface boards. Data exchange between the plurality of interface boards may be implemented by using a switching board, and the plurality of interface boards can provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 1832 may be a read-only memory (ROM) or another type of static storage device that can store static information and instructions. Alternatively, the memory 1832 may be a random-access memory (RAM) or another type of dynamic storage device that can store information and instructions. Alternatively, the memory 1832 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), or a magnetic disk or another magnetic storage device.

Alternatively, the memory 1832 may be any medium that can carry or store expected program code in a form of instructions or a data structure and can be accessed by a computer, but is not limited thereto. The memory 1832 may exist independently, and is connected to the processor 1831 through a communications bus. Alternatively, the memory 1832 may be integrated into the processor 1831.

The memory 1832 is configured to store program code, and the processor 1831 controls execution of the program code, so as to execute the route importing method provided in the foregoing embodiments. The processor 1831 is configured to execute the program code stored in the memory 1832. The program code may include one or more software modules. The one or more software modules may be the functional modules provided in any one of embodiments shown in FIG. 16 and FIG. 17.

In a specific embodiment, the network interface 1833 may be an apparatus that uses any transceiver, and is configured to communicate with another device or a communication network, for example, an ethernet, a radio access network (RAN), or a wireless local area network (WLAN).

Figure 19:
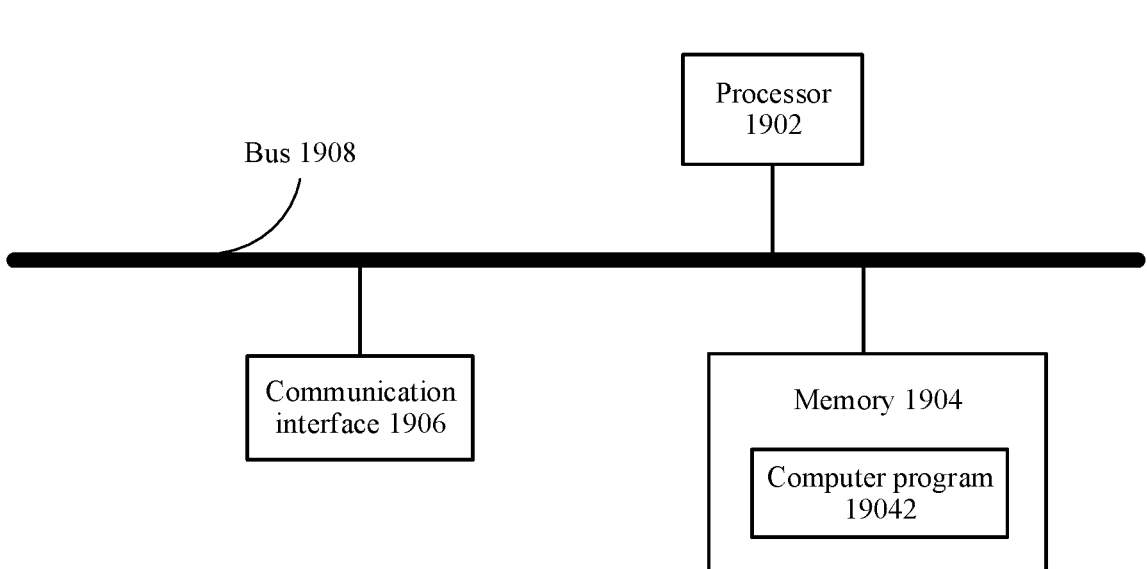
FIG. 19 is a schematic diagram of a hardware structure of another network device according to an embodiment of the present disclosure.

FIG. 19 is a schematic diagram of a hardware structure of another network device 1900 according to an embodiment of the present disclosure. The network device 1900 may be the first network device in any one of the foregoing embodiments. The network device 1900 may be a switch, a router, or another network device that forwards a packet. Refer to FIG. 19. The network device 1900 includes a processor 1902, a memory 1904, a communication interface 1906, and a bus 1908. The processor 1902, the memory 1904, and the communication interface 1906 are communicatively connected to each other via the bus 1908. A person skilled in the art should understand that a manner of connection between the processor 1902, the memory 1904, and the communication interface 1906 shown in FIG. 19 is merely an example. In an implementation process, the processor 1902, the memory 1904, and the communication interface 1906 may be communicatively connected to each other in another manner of connection other than via the bus 1908.

The memory 1904 may be configured to store a computer program 19042, and the computer program may include instructions and data. In this embodiment of the present disclosure, the memory 1904 may be various types of storage media, for example, a RAM, a ROM, a non-volatile RAM (NVRAM), a programmable ROM (PROM), an erasable PROM (EPROM), an electrically erasable PROM (EEPROM), a flash memory, an optical memory, a register, and the like. In addition, the memory 1904 may include a hard disk and/or a memory.

The processor 1902 may be a general-purpose processor. The general-purpose processor may be a processor that reads and executes a computer program (for example, the computer program 19042) stored in a memory (for example, the memory 1904) to perform a specific step and/or operation. In a process of performing the foregoing step and/or operation, the general-purpose processor may use data stored in the memory (for example, the memory 1904). The general-purpose processor may be, for example, but is not limited to, a central processing unit (CPU). In addition, the processor 1902 may alternatively be a dedicated processor. The dedicated processor may be a processor specially designed to perform a specific step and/or operation. The dedicated processor may be, for example, but not limited to, a digital signal processor (DSP), an ASIC, or an FPGA. In addition, the processor 1902 may alternatively be a combination of a plurality of processors, for example, a multi-core processor. The processor 1902 may include at least one circuit, to perform all or some of the steps of the route importing method provided in the foregoing embodiments.

The communication interface 1906 may include an interface that is used to implement interconnection between components in the network device 1900, for example, an input/output (I/O) interface, a physical interface, or a logical interface, and an interface that is used to implement interconnection between the network device 1900 and another device (for example, a network device or user equipment). The physical interface may be a GE interface, and may be configured to implement interconnection between the network device 1900 and another device (for example, a network device or user equipment). The logical interface is an interface in the network device 1900, and may be configured to implement interconnection of components inside the network device 1900. It is easy to understand that the communication interface 1906 may be used by the network device 1900 to communicate with another network device and/or user equipment. For example, the communication interface 1906 is used to send and receive information between the network device 1900 and the another network device.

The bus 1908 may be any type of communication bus, for example, a system bus, which is configured to implement interconnection between the processor 1902, the memory 1904, and the communication interface 1906.

The foregoing components may be separately disposed on chips that are independent of each other, or at least some or all of the components may be disposed on a same chip. Whether the components are separately disposed on different chips or are integrated and disposed on one or more chips usually depends on a requirement of product design. This embodiment of the present disclosure imposes no limitation on specific implementations of the foregoing components.

The network device 1900 shown in FIG. 19 is merely an example. In an implementation process, the network device 1900 may further include another component, which is not listed one by one in this specification. The network device 1900 shown in FIG. 19 may perform route importing between VPN instances by performing all or some of the steps of the route importing method provided in the foregoing embodiments.

This embodiment of the present disclosure provides a computer-readable storage medium. The computer-readable storage medium stores a computer program, and when the computer program is executed by a processor, a computer is enabled to perform all or some of the steps of the route importing method provided in the foregoing method embodiments.

This embodiment of the present disclosure provides a computer program product including instructions. When the computer program product is run on a computer, the computer is enabled to perform all or some of the steps of the route importing method provided in the foregoing method embodiments.

This embodiment of the present disclosure provides a chip. The chip includes a programmable logic circuit and/or program instructions. When the chip is executed, the chip is configured to perform all or some of the steps of the route importing method provided in the foregoing method embodiments.

This embodiment of the present disclosure further provides a communication system.

The communication system includes at least two network devices. A first network device in the at least two network devices is the network device shown in any one of FIG. 16 to FIG. 19, and another network device in the at least two network devices is configured to send routing information to the first network device, or is configured to receive routing information sent by the first network device.

Optionally, the network device may be a PE device, and the communication system may be the EVPN network shown in FIG. 1 to FIG. 3. Optionally, the communication system further includes user equipment (for example, a VM) mounted to the network device. For example, as shown in FIG. 1, the VM 11 and the VM 12 are mounted to the PE 1, the VM 21 is mounted to the PE 2, and the VM 31 is mounted to the PE 3.

Optionally, the communication system further includes a CE device, and the user equipment is mounted to the PE device via the CE device. For example, as shown in FIG. 2, the VM 11 and the VM 12 are mounted to the PE 1 via the CE 1, the VM 21 is mounted to the PE 2 via the CE 2, and the VM 31 is mounted to the PE 3 via the CE 3.

Optionally, the communication system further includes a GW device, and the user equipment is mounted to the PE device via the CE device and the GW device. For example, as shown in FIG. 3, the VM 11 and the VM 12 are mounted to the PE 1 via the CE 1 and the GW 1, the VM 21 is mounted to the PE 2 via the CE 2 and the GW 2, and the VM 31 is mounted to the PE 3 via the CE 3 and the GW 3.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

Mutual reference may be made to different types of embodiments such as the method embodiment and the apparatus embodiment provided in embodiments of the present disclosure. Names or numbers of steps in the present disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

In the corresponding embodiments provided in the present disclosure, it should be understood that the disclosed apparatus and the like may be implemented in other composition manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

Units described as separate parts may or may not be physically separate; and parts described as units may or may not be physical units, may be located in one position, or may be distributed on a plurality of network devices (such as user equipment). Some or all of the units may be selected based on actual requirements to achieve the objectives of the solutions of embodiments.

The foregoing descriptions are merely example implementations of the present disclosure, but are not intended to limit the protection scope of the present disclosure. Any equivalent modification or replacement readily figured out by a person skilled in the art within the technical scope disclosed in the present disclosure shall fall within the protection scope of this application. Therefore, the protection scope of the present disclosure shall be subject to the protection scope of the claims.

What is claimed is:

1. A method implemented by a first network device, the method comprising:

importing first routing information from a first virtual private network (VPN) instance in a second network device to a second VPN instance in the first network device, wherein the first routing information corresponds to a first export route target (ERT) in the first VPN instance, wherein the first ERT matches a first import route target (IRT) in the second VPN instance; and importing the first routing information from the second VPN instance to a third VPN instance in the first network device, wherein the second VPN instance comprises a second ERT that corresponds to the first routing information in the second VPN instance, and wherein the second ERT matches a second IRT in the third VPN instance.

2. The method of claim 1, further comprising further importing the first routing information from the second VPN instance to the third VPN instance in response to matching the second ERT to the IRT in the second VPN instance.

3. The method of claim 1, further comprising:

obtaining instructions prior to importing the first routing information from the second VPN instance to the third VPN instance; and allowing according to the instructions, the first routing information to be imported from the second VPN instance to the third VPN instance.

4. The method of claim 1, further comprising adding an importing tag corresponding to the first routing information to the third VPN instance after importing the first routing information to the third VPN instance, wherein the importing tag indicates that the first routing information in the third VPN instance is imported from a local VPN instance of the first network device.

5. The method of claim 4, further comprising determining, based on the importing tag in the third VPN instance, not to import the first routing information in the third VPN instance to the local VPN instance of the first network device.

6. The method of claim 1, further comprising:

determining a third ERT in the third VPN instance corresponding to the first routing information after importing the first routing information from the second VPN instance to the third VPN instance;

determining whether the third ERT matches any IRT in a local VPN instance of the first network device; and determining, when the third ERT does not match any IRT in a local VPN instance of the first network device, not to import the first routing information in the third VPN instance to the local VPN instance of the first network device.

7. The method of claim 6, further comprising sending, using the third VPN instance, the first routing information in the third VPN instance to a third network device, wherein the first routing information in the third VPN instance corresponds to the third ERT, wherein the third ERT indicates that the third network device imports the first routing information from the third VPN instance to a fourth VPN instance in the third network device.

8. The method of claim 7, wherein sending the first routing information in the third VPN instance to the third network device comprises sending based on an external advertisement function of the first network device, the first routing information in the third VPN instance to the third network device.

9. The method of claim 1, wherein both the first network device and the second network device are provider edge (PE) devices.

10. A method implemented by a first network device, the method comprising:

importing first routing information from a first virtual private network (VPN) instance in the first network device to a second VPN instance in the first network device, wherein the first routing information in the second VPN instance corresponds to a first export route target (ERT) in the second VPN instance; and sending, using the second VPN instance, the first routing information in the second VPN instance to a second network device, wherein the first ERT indicates that the second network device imports the first routing information from the second VPN instance to a third VPN instance in the second network device, wherein the second VPN instance comprises a second ERT that corresponds to the first routing information in the second VPN instance, and wherein the second ERT matches a second IRT in the third VPN instance.

11. The method of claim 10, further comprising further importing the first routing information from the first VPN instance to the second VPN instance in response to matching the second ERT to the IRT in the second VPN instance.

12. The method of claim 10, wherein the first routing information is either generated by the first VPN instance, learned by the first VPN instance from a Border Gateway Protocol (BGP) peer of the first network device, or imported by the first VPN instance from a third VPN instance in a BGP Ethernet VPN BGP EVPN peer of the first network device.

13. The method of claim 10, further comprising:

obtaining instructions prior to importing the first routing information from the first VPN instance to the second VPN instance; and allowing according to the instructions, the first routing information to be imported from the first VPN instance to the second VPN instance.

14. The method of claim 10, further comprising adding an importing tag corresponding to the first routing information to the second VPN instance after importing the first routing information from the first VPN instance to the second VPN instance, wherein the importing tag indicates that the first routing information in the second VPN instance is imported from a local VPN instance of the first network device.

15. The method of claim 14, further comprising determining based on the importing tag in the second VPN instance, not to import the first routing information in the second VPN instance to the local VPN instance of the first network device.

16. The method of claim 10, further comprising:

determining the first ERT in the second VPN instance;

determining whether the first ERT matches any IRT in a local VPN instance of the first network device; and determining when the first ERT does not match any IRT in the local VPN instance of the first network device, not to import the first routing information in the second VPN instance to the local VPN instance of the first network device.

17. The method of claim 10, wherein sending the first routing information in the second VPN instance to the second network device comprises sending, based on an external advertisement function of the first network device, the first routing information in the second VPN instance to the second network device.

18. A first network device comprising:

a memory configured to store instructions; and at least one processor coupled to the memory and configured to execute the instructions to cause the first network device to:

import first routing information from a first virtual private network (VPN) instance in a second network device to a second VPN instance in the first network device, wherein the first routing information corresponds to a first export route target (ERT) in the first VPN instance, wherein the first ERT matches a first import route target (IRT) in the second VPN instance; and import the first routing information from the second VPN instance to a third VPN instance in the first network device, wherein the second VPN instance comprises a second ERT that corresponds to the first routing information in the second VPN instance, and wherein the second ERT matches a second IRT in the third VPN instance.

19. The first network device of claim 18, wherein the at least one processor is further configured to:

obtain instructions prior to importing the first routing information from the second VPN instance to the third VPN instance; and allow according to the instructions, the first routing information to be imported from the second VPN instance to the third VPN instance.

20. The first network device of claim 18, wherein the at least one processor is further configured to add an importing tag corresponding to the first routing information to the third VPN instance after importing the first routing information to the third VPN instance, wherein the importing tag indicates that the first routing information in the third VPN instance is imported from a local VPN instance of the first network device.

* * * * *